(12) United States Patent
Meyer et al.

(10) Patent No.: US 6,605,235 B1
(45) Date of Patent: Aug. 12, 2003

(54) CHOLESTERIC LAYERED MATERIAL HAVING AN IMPROVED COLOR IMPRESSION, AND THE PRODUCTION THEREOF

(75) Inventors: Frank Meyer, Heidelberg (DE); Frank Prechtl, Frankfurt (DE); Norbert Schneider, Altrip (DE); Peter Heilmann, Bad Dürkheim (DE); Volker Koch, Battenberg (DE); Robert Parker, Mannheim (DE); Volker Richter, Heidelberg (DE); Peter Schuhmacher, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 87 days.

(21) Appl. No.: 09/648,369

(22) Filed: Aug. 25, 2000

(30) Foreign Application Priority Data

Aug. 27, 1999 (DE) .......................... 199 40 682

(51) Int. Cl.⁷ ............................... C09K 19/52
(52) U.S. Cl. .................... 252/299.01; 428/1.1
(58) Field of Search .................. 428/1.1–1.2, 1.5–1.53, 428/1.61; 252/299.01

(56) References Cited

U.S. PATENT DOCUMENTS

| | | | |
|---|---|---|---|
| 5,362,315 A | * 11/1994 | Müller-Rees et al. | .... 252/299.5 |
| 5,744,057 A | 4/1998 | Meyer et al. | |
| 5,780,629 A | 7/1998 | Etzbach et al. | |
| 5,788,880 A | 8/1998 | Schierlinger et al. | |
| 5,827,449 A | 10/1998 | Hanelt et al. | |
| 5,851,604 A | * 12/1998 | Müller-Rees et al. | .......... 428/1 |
| 5,886,242 A | 3/1999 | Etzbach et al. | |
| 5,942,030 A | * 8/1999 | Schuhmacher et al. | ..... 106/493 |
| 6,071,438 A | * 6/2000 | Leigeber et al. | ....... 252/299.01 |
| 6,203,736 B1 | * 3/2001 | Gailberger et al. | ......... 264/140 |
| 6,207,770 B1 | * 3/2001 | Coates et al. | .......... 252/299.01 |

FOREIGN PATENT DOCUMENTS

| | | | | |
|---|---|---|---|---|
| DE | 43 42 280 | 6/1995 | | |
| DE | 195 20 660 | 6/1995 | | |
| DE | 44 16 191 | * 9/1995 | .......... C09B/67/20 |
| DE | 195 20 704 | 12/1996 | | |
| DE | 195 32 408 | 3/1997 | | |
| DE | 195 41 820 | 5/1997 | | |
| DE | 196 02 848 | 7/1997 | | |
| DE | 197 35 829 | 8/1997 | | |
| DE | 197 44 321 | 10/1997 | | |
| DE | 196 19 460 | 11/1997 | | |
| DE | 197 38 369 | 12/1997 | | |
| DE | 197 57 699 | 12/1997 | | |
| DE | 196 31 658 | 2/1998 | | |
| DE | 197 13 638 | 10/1998 | | |
| DE | 197 17 371 | 10/1998 | | |
| DE | 198 35 730 | 2/1999 | | |
| DE | 197 38 368 | 3/1999 | | |
| DE | 198 43 724 | 4/1999 | | |
| DE | 197 49 123 | 5/1999 | | |
| EP | 0 358 208 | * 3/1990 | .......... C09K/19/40 |
| EP | 0 601 483 | * 9/1995 | .......... C09K/19/40 |
| EP | 0 747 382 | 12/1996 | | |
| EP | 0 887 398 | 12/1998 | | |
| EP | 0 985 544 | 3/2000 | | |
| EP | 0 985 545 | 3/2000 | | |
| EP | 0 985 544 | 5/2000 | | |

(List continued on next page.)

*Primary Examiner*—Mark F. Huff
*Assistant Examiner*—Jennifer R. Sadula
(74) *Attorney, Agent, or Firm*—Oblon, Spivak, McClelland, Maier & Neustadt, P.C.

(57) ABSTRACT

The invention relates to cholesteric layered material having an improved color impression, to pigments prepared therefrom, and to a process for the production and use thereof.

30 Claims, 7 Drawing Sheets

FOREIGN PATENT DOCUMENTS

| | | |
|---|---|---|
| GB | 2 328 436 | 2/1992 |
| GB | 2 330 139 | 4/1999 |
| WO | WO 96/02597 | 2/1996 |
| WO | WO 97/00600 | 1/1997 |
| WO | WO 97/49694 | 12/1997 |
| WO | WO 98/03610 | 1/1998 |
| WO | WO 98/04544 | 2/1998 |
| WO | WO 98/23580 | 6/1998 |
| WO | WO 98/14442 | 9/1998 |
| WO | WO 98/47979 | 10/1998 |
| WO | WO 99/11719 | 3/1999 |
| WO | WO 99/11733 | 3/1999 |

\* cited by examiner

CHOLESTERIC LAYERED MATERIAL HAVING AN IMPROVED COLOR IMPRESSION, AND THE PRODUCTION THEREOF

The present invention relates to cholesteric layered materials having an improved color impression, comprising at least one three-dimensionally crosslinked, aligned cholesteric layer, to a process for their production, and to their use.

Cholesteric layers, pigments prepared therefrom and compositions containing cholesteric pigments are widely used, for example in the motor vehicle or motor vehicle accessory sector, in the computer, leisure, sport and toy sector, as optical components, such as polarizers or filters, in the cosmetics area, in the textiles, leather or jewelry area, in gift articles, in writing implements, or on spectacle frames, in the construction sector, in the domestic sector, in print products of all types and in the production of paints and coatings, furthermore for the anticounterfeiting treatment of articles, for the coating of utility articles or for the painting of motor vehicles.

In these applications, the cholesteric layers and the pigments and compositions containing the latter have to satisfy a number of conditions in order to be usable for the above-mentioned purposes. Firstly, the color impression should be as bright as possible, and secondly the color impression should be substantially independent of external stimuli, in particular it should be stable over a broad temperature and pressure range and to the action of solvents. In addition, the cholesteric layers should be as thin as possible in order that the pigments prepared therefrom have the smallest possible thickness, thus reducing costs and simplifying the applications.

On use of the cholesteric layers known from the prior art, the problem of inadequate color brightness frequently arises. It is therefore an object of the present invention to provide cholesteric layered material which has improved color brightness.

We have found that, surprisingly, this object is achieved by the provision of a cholesteric layered material comprising at least one three-dimensionally crosslinked, aligned cholesteric layer, where the crosslinked, cholesteric layer(s) has (have) a homogeneous interference line pattern essentially over the entire layer thickness. Investigations by the applicant have shown that the interference line pattern which can be observed in thin sections was particularly inhomogeneous in conventional materials having inadequate brightness.

Cholesteric layered materials which satisfy this homogeneity criterion exhibit superior color brightness. The same applies to the products derived from layered materials of this type, for example pigments and films.

Figure 1:
FIG. 1 shows the TEM micrograph of a single cholesteric layer with a highly inhomogeneous interference line pattern.

In addition, the layered materials according to the invention have an essentially smooth surface and the interference lines extend essentially over the entire thickness of the layer parallel to the surface. For the purposes of the present invention, interference line homogeneity is taken to mean, in particular, that individual interference lines exhibit no inversions (direction reversal) and/or eye formation (formation of circular interference lines) in their course. Slight deviations in the interference line pattern through individual lines exhibiting a vertical offset to the surface which is approximately equal to the separation between two interference lines are also covered in accordance with the invention.

The interference line homogeneity and surface smoothness can be observed particularly advantageously from thin sections which are studied for the course of the interference lines at a magnification of from 10,000 to 20,000 in a transmission electron microscope (TEM).

According to a further preferred embodiment, cholesteric layered material whose layer(s), besides interference line homogeneity, exhibits (exhibit) no visually evident color shift, for example inducible by external stimuli, is provided in accordance with the invention.

Preferred cholesteric layered materials which additionally satisfy this stability criterion exhibit superior color stability on exposure to heat and/or solvents. The same applies to the products derived from layered materials of this type, for example pigments and films.

Layered materials of this type according to the invention, and products derived therefrom, are distinguished in particular by the fact that, besides the above-described interference line homogeneity, they exhibit no visually evident color shift on:

a) a change in the temperature of the layered material in the range from −30° C. to +250° C., in particular from 0 to 250° C., or from 0 to 200° C.;

b) warming to temperatures in the range from 80 to 160° C. or from 80 to 130° C. with simultaneous exposure to a diluent, in particular an organic diluent; and/or c) treatment for minutes at 80° C. in xylene followed by drying.

According to a preferred embodiment, cholesteric layered material whose reflection maximum, for example after treatment with xylene at 80° C. for minutes, cannot be shifted by more than about 2 nm, for example from 0 to 8 nm, from 0 to 5 nm or from 0 to 2 nm, to a higher or lower wavelength range is provided in accordance with the invention. On a change in the reflection maximum in the above-mentioned range, no "visually evident color shift" for the purposes of the invention exists.

In the cholesteric layered materials according to the invention, each cholesteric layer has a mean dry layer thickness (layer thickness of the dried and, if appropriate, crosslinked layer) of at least one pitch height and of less than or equal to about 5 $\mu$m, for example from 0.5 to 3 $\mu$m, in particular less than or equal to about 2 $\mu$m, for example from 0.5 to 2 $\mu$m, preferably less than or equal to about 1 $\mu$m, for example from 0.5 to 1 $\mu$m.

If a number of layers are present simultaneously, the individual layer thicknesses are identical or different. The invention thus furthermore relates to cholesteric layered material having a plurality of cholesteric layers of identical or different thickness and of identical or different chemical composition each of which has a homogeneous interference line pattern and in addition, where appropriate, color shift stability.

In particular, the invention also relates to cholesteric layered materials which have a three-layer structure and an interlayer between two cholesteric layers according to the invention which partially or fully absorbs transmitted light. The absorbent interlayer here can have properties as described, for example, in PCT/EP 98/05544, PCT/EP 98/05545 or DE-A-197 57 699. The disclosure content of these protective rights are expressly incorporated herein by way of reference.

The invention furthermore relates to cholesteric pigments comprising at least one crosslinked, aligned cholesteric layer which are obtainable by comminuting the above-described single- or multilayer cholesteric layered material. The invention relates in particular to pigments having a mean particle size in the range from to 50 $\mu$m and a thickness of up to 5 $\mu$m in which, in addition, the crosslinked cholesteric layer(s) has (have) interference line homogeneity and in addition high temperature stability and does (do) not exhibit any visually evident color shift in the temperature range from room temperature (about 20° C.) to about 250° C. In particular, no color shift is evident on increasing the temperature from 80° C. to 130° C. or from 80° C. to 160° C. In particular, this color shift stability is also evident if the temperature increase takes place with simultaneous exposure to organic solvents or diluents, for example toluene or xylene or other solvents and diluents which are conventional in the surface coating technology, or after treatment in xylene at 80° C. for 15 minutes followed by drying.

The invention also relates to a process for the production of the above-described cholesteric layered materials by:

a) application, in particular casting, and simultaneous alignment of a cholesteric coating composition comprising at least one crosslinkable substance to a support with formation of a first cholesteric layer, where the support is essentially chemically inert to the cholesteric layer to be applied;

b) drying and crosslinking of the applied layer, where the conditions are selected in such a way that the resultant layer has a homogeneous interference line pattern essentially over the entire layer thickness and where, if appropriate, the conditions are additionally selected in such a way that no visually evident color shift is observed on exposure to solvents and/or elevated temperature; and c) removal of the layered material from the support after one or more further cholesteric layers have, if desired, been applied to the layer obtained in accordance with step a). The application, drying and curing of the further layers is carried out in the same way as in steps a) and b).

In particular, it has been observed in accordance with the invention that the interference line homogeneity and thus the brightness of the cholesteric layered material is essentially influenced by the choice of the following process parameters:

a) Dryer temperature; and b) Residence time of the dried cholesteric layer in the dryer at elevated temperature; and c) Layer thickness of the applied cholesteric layer.

Further process parameters by means of which the homogeneity can be influenced are:

d) Shearing of the coating composition; and e) Solids content of the coating composition.

With increasing dryer temperature (for example from 60° C. to 100° C.), not only is removal of the solvent accelerated, but also the viscosity of the cholesteric film is reduced, which results in significantly improved interference line homogeneity.

Furthermore, the interference line homogeneity can be affected by the length of the residence time of the dried and conditioned cholesteric layer in the dryer. The longer and the higher the temperatures and residence times in the dryer, the better the interference line homogeneity.

It has also been observed in accordance with the invention that a reduction in the layer thickness promotes the interference line homogeneity.

The positive effects which can be achieved by high drying intensity and low layer thickness can be additionally promoted by not selecting the coating rate and thus the shear force too low.

It has additionally been observed in accordance with the invention that the solvent resistance of the cholesteric layered material can be affected essentially by the curing conditions. A preferred variant of layered materials according to the invention therefore relates to those which exhibit both a homogeneous interference line pattern and excellent solvent resistance.

The curing conditions can, in accordance with the invention, be set optimally during the curing via various parameters, in particular the output of the radiation source, the curing duration (i.e. residence time in the radiation region of the radiation source) and the layer temperature.

It has also been observed in accordance with the invention that the adhesion between a newly applied and the underlying cholesteric layer can be set specifically and thus in accordance with need by varying the layer temperature during the curing (for example via a heatable roll). Thus, for example, it is possible to produce multilayer composites having stable interlayer adhesion and low adhesion to the support which in this way can be removed well from the support as a composite.

Use is preferably made in accordance with the invention of a support which does not adversely affect the alignment of the cholesteric layer cast thereon during drying and curing. It is furthermore preferred that the support has an adhesion of less than about 1 cN to the dried and crosslinked first cholesteric layer cast thereon. Suitable supports are selected from plastic, metal, glass and ceramic supports.

Another process variant is carried out in such a way that, in the case of multiple coating with cholesteric layers, the second and any further layers in the composite can be removed selectively from the first layer on the support.

In accordance with a preferred process variant, use is made of a plastic support which comprises a release layer, for example of crosslinked, preferably aligned, cholesteric material, onto which the first cholesteric layer is cast. Examples of other suitable release layer materials are polyamides, polyacrylates and Teflon. This is particularly advantageous if a cholesteric layer or a layer composite has to be removed from the support, for example if pigments are to be produced from the layered material or layer composites which reflect polarized light and are free from damage are to be transferred to another support. The adhesion here between plastic support and release layer is preferably at least about 2 to 10 times, for example 5 times, greater than the adhesion between release layer and first cholesteric layer. This favors simple detachment of the cholesteric layer or of the layer composite from the support with the release layer simultaneously remaining on the support, which can then, if desired, be re-coated.

Preference is given to coating compositions according to the invention for the cholesteric layer(s) and the release layer which, independently of one another, have a viscosity in the range from about 1 to 50 mPas. In addition, the coating rate is in the range from about 1 to 800 m/min. The solids content of the coating composition is usually in the range from about 30 to 70% by weight.

According to a preferred process variant, the drying is carried out at a temperature in the range from about 60 to 150° C., in particular from about 80 to 120° C. The length of the drying zone here is selected in such a way that the residence time of the layer is from about 1 to 120 seconds. The dry layer thickness is preferably less than 3 μm. The solids content is preferably from about 30 to 60% by weight.

According to a preferred process variant, the subsequent crosslinking of the cholesteric layer(s) and of any cholesteric release layer present is carried out by radiation curing, in particular by electron beams or UV radiation, with simultaneous warming of the layer to be cured. The emitter power here is in the range from about 50 to 200 watts/cm. The curing is preferably carried out in an inert-gas atmosphere, for example under nitrogen, and at a residence time under the UV lamp of from 2 to 5000 msec.

The layer temperature during the radiation curing is set at above about 40° C., preferably at least 80° C., in particular at least 90° C., for example from 90 to 120° C.

The optimum parameter combination in each case can be determined by the person skilled in the art in a few preliminary experiments on the basis of the teaching according to the invention.

As the attached examples show, cholesteric layered material having high interference line homogeneity is obtained, for example if layer thicknesses of about 2.5 μm or less, for example 0.9 μm, are selected, if drying is carried out at a temperature of above about 60° C., for example 85 or 100° C., for a period of from about 5 to 30 seconds.

If, in addition, the curing conditions are selected in such a way that the emitter power is about 120 W/cm, the curing duration is from 30 to 120 msec and the layer temperature is in the range from 60 to 100° C., layered material is obtained which in addition exhibits high solvent resistance.

According to a further variant of the process according to the invention, a film is applied to the last-applied cholesteric layer, and the one or more cholesteric layers is (are) removed from the support as a composite with this film.

According to another variant, the one or more cholesteric layer(s) is (are) removed from the support by blasting with compressed air, a water jet or steam and ground to give pigments.

The invention also relates to compositions comprising at least one cholesteric single- or multilayered pigment having improved color shift stability.

The invention furthermore relates to the use of layered materials or pigments according to the invention in the motor vehicle or motor vehicle accessory sector, in the computer, leisure, sport and toy sector, in optical elements, in the cosmetics area, in the textiles, leather or jewelry area, in gift articles, in writing implements or on spectacle frames, in the construction sector, in the domestic sector, in print products of all types, and in the production of paints and coatings.

The color effects which can be achieved by the cholesteric films or cholesteric pigments according to the invention also cover, due to the wide range of reflection wavelengths which can be achieved, the UV and IR regions and of course the region of visible light. If the pigments according to the invention are applied to banknotes, check cards, other cashless payment means or identity cards (for example by known printing methods) or incorporated into these, this makes identical copying of these articles considerably more difficult. The present invention thus furthermore relates to the use of the pigments according to the invention for the anticounterfeiting treatment of articles, in particular banknotes, check cards or other cashless payment means or identity cards.

For the purposes of the present invention, the term "optical elements" is taken to mean all articles which utilize the optical properties of nematic and/or cholesteric liquid crystals. These can be, by way of selection, retardation films, notch filters, color filters for displays, polarizers, but also simply mirrors for decorative purposes. The three-dimensional shape of the optical elements can be planar, but also with a concave or convex curve.

In particular, the invention also relates to the use of the above compositions for the coating of utility articles or for the painting of motor vehicles.

A preferred area of application is also polarizers comprising a layered material according to the invention, if desired applied to a support film. Thus, for example, broad-band polarizers can be produced which comprise a layered material having a number of, for example, from 3 to 20 cholesteric layers with reflection maxima matched to one another, where the polarizer has a total thickness (without support film) in the range from about 2 to 50 μm.

Depending on the application, the layered material according to the invention can remain on the support, be detached therefrom or transferred to a new support. Thus, for example, IR-reflective layer composites (with transparent adhesive layer) can be transferred to glass or Plexiglass sheets.

Suitable compositions of the cholesteric layer are described in DE-A-197 38 368.8 and 197 38 369.6 by the same applicant. The disclosure content of the application is incorporated by way of reference in its full scope. In particular, it is evident from DE-A-197 38 369.6 that it is advantageous to produce cholesteric layers using a cholesteric mixture which has been rendered pourable by dilution. Cholesteric and nematic molecules which can be used for the production of the layers are described, for example, in DE-A-43 42 280, 196 02 848, 197 136 38, 195 32 408, 197 04 506, 196 31 658, 197 17 371, 195 41 820, 196 19 460, 197 35 829, 197 44 321 and 197 49 123, EP-A-0 358 208, WO 97/00600, 97/49694, 98/03610, 98/04544, 98/14442, 98/23580 and 98/47979, which are expressly incorporated herein by way of reference.

The cholesteric layers preferably comprise cholesteric mixtures selected from a) at least one cholesteric, polymerizable monomer;

b) at least one achiral, nematic, polymerizable monomer and a chiral compound;

c) at least one cholesteric, crosslinkable polymer;

d) a cholesteric polymer in a polymerizable diluent; or e) at least one cholesteric polymer whose cholesteric phase can be frozen by rapid cooling to below the glass transition temperature, in the cured state.

The alignment of the cholesteric molecules in the cholesteric layer is fixed by curing. On use of a plurality of cholesteric layers, these have identical or different optical properties. They can, in particular, reflect light of identical or different wavelength, i.e. can be of identical or different color. In the latter case, particularly interesting color effects can be achieved. For example, the layers have opposite directions of optical rotation, meaning that, for example, one layer reflects light of a certain wavelength in a left-handed circular-polarized manner, whereas another layer reflects light of the same wavelength in a right-handed circular-polarized manner. For example, a paint comprising pigments according to the invention in this preferred embodiment therefore advantageously appears particularly bright, since the pigments in the paint films face the incident light in the random distribution, so that the paint reflects both right- and left-handed circular-polarized light of a certain wavelength, whereas a paint comprising only pigments having only a cholesteric layer or having a plurality of cholesteric layers having the same direction of optical rotation allows either the left- or right-handed circular-polarized light to pass through. The formation of a plurality of cholesteric layers having different reflection wavelengths allows broad-band polarizers to be produced.

The plurality of layers can also have identical or different mechanical properties. For example, they can be of different thickness or brittleness.

A preferred group of coating compositions which can be used in accordance with the invention (above group b)) comprises, as nematic component, at least one liquid-crystalline compound of the general formula I

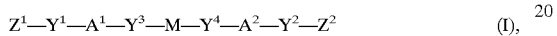
$$Z^1-Y^1-A^1-Y^3-M-Y^4-A^2-Y^2-Z^2 \qquad (I),$$

in which $Z^1$ and $Z^2$, independently of one another, are a radical containing reactive, polymerizable groups;

$Y^1-Y^4$, independently of one another, are a single chemical bond, —O—, —S—, —O—CO—, —CO—O—, —O—CO—O—, —CO—NR—, —NR—CO—, —O—CO—NR—, —NR—CO—O— or —NR—CO—NR, and R is $C_1$–$C_4$-alkyl;

$A^1$ and $A^2$, independently of one another, are a spacer having 1 to 30 carbon atoms in which the carbon chain is, if desired, interrupted by ether oxygen, thioether-sulfur or non-adjacent imino or $C_1$–$C_4$-alkylimino groups; and M is a mesogenic group.

Preferred radicals $Z^1$ and $Z^2$ are the following

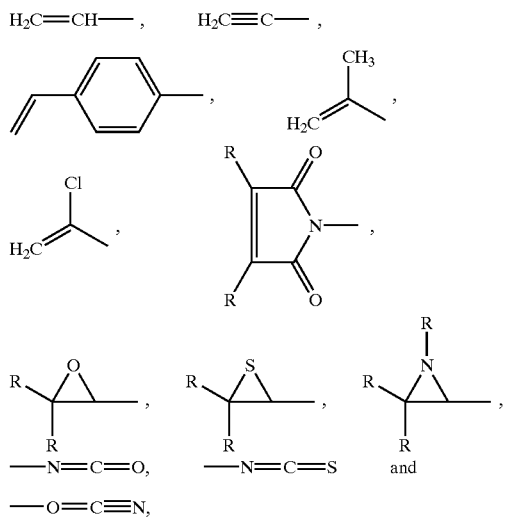

where the radicals R are $C_1$–$C_4$-alkyl and may be identical or different.

Of the reactive polymerizable groups, the cyanates can spontaneously trimerize to cyanurates and are therefore preferred. Compounds containing epoxide, thuirane, aziridine, isocyanate and isothiocyanate groups require further compounds containing complementary reactive groups for polymerization. Thus, for example, isocyanates can polymerize with alcohols to give urethanes and with amines to give urea derivatives. An analogous situation applies to thuiranes and aziridines. The complementary reactive groups here can either be present in a second compound according to the invention which is mixed with the first or they can be introduced into the polymerization mixture by means of auxiliary compounds containing two or more of these complementary groups. If these compounds each contain two of these reactive groups, linear polymers having a predominantly thermoplastic character are formed. If the compounds contain more than two reactive groups, crosslinked polymers which are particularly mechanically stable are formed. The maleimido group is particularly suitable for free-radical copolymerization with olefinic compounds, such as styrene.

Preferred polymerizable groups $Z^1$ and $Z^2$ are those which undergo free-radical polymerization, i.e. in particular olefinically unsaturated groups, and of these the groups

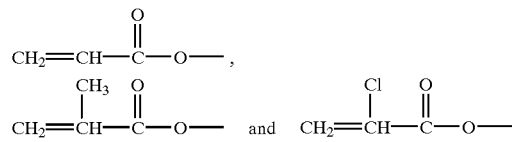

are of particular importance in combination with $Y^1$ or $Y^2$.

The moieties $Z^1$, $Z^2$, $A^1$, $A^2$, M and X present in the compounds according to the invention are linked to one another via bridging units $Y^1-Y^4$, such as —O—, —S—, —CO—O—, —O—CO—, —O—CO—O—, —CO—NR—, —NR—CO—, —O—CO—NR—, —NR—CO—O—, —NR—CO—NR—, or alternatively via a direct bond. Chiral polymerizable compounds containing one of these groups have the advantageous property of particularly low phase-conversion temperatures and broad phase ranges and are thus particularly suitable for applications at room temperature. This is particularly true of the carbonate group.

Suitable spacers $A^1$ and $A^2$ are all groups known for this purpose. The spacers generally have from 1 to 30, preferably 3 to 12, carbon atoms and consist of predominantly linear aliphatic groups. They may be interrupted in the chain, for example by non-adjacent oxygen or sulfur atoms or imino or alkylimino groups, such as methylimino groups. Suitable substituents for the spacer chain are also fluorine, chlorine, bromine, cyano, methyl and ethyl.

Examples of representative spacers are the following

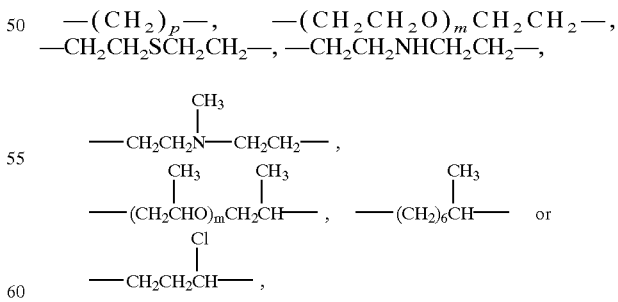

where m is from 1 to 3 and p is from 1 to 12.

The radicals M can be any known mesogenic groups. Particularly suitable are groups of the formula Ia

$$-(-T-Y^5-)_r-T- \qquad (Ia)$$

in which the variables have the following meanings:

T are divalent saturated or unsaturated, isocyclic or heterocyclic radicals, $Y^5$ is a bridging unit as defined for $Y^1$–$Y^4$; —CH$_2$—O—; —O—CH$_2$—; —CH=N—, —N=CH— or —N=N—, r is 0, 1, 2 or 3, where the radicals T and $Y^5$ in the case where r>0 may be identical or different.

r is preferably 1 or 2.

The radicals T may also be ring systems which are substituted by fluorine, chlorine, bromine, cyano, hydroxyl or nitro. Preferred radicals T are the following:

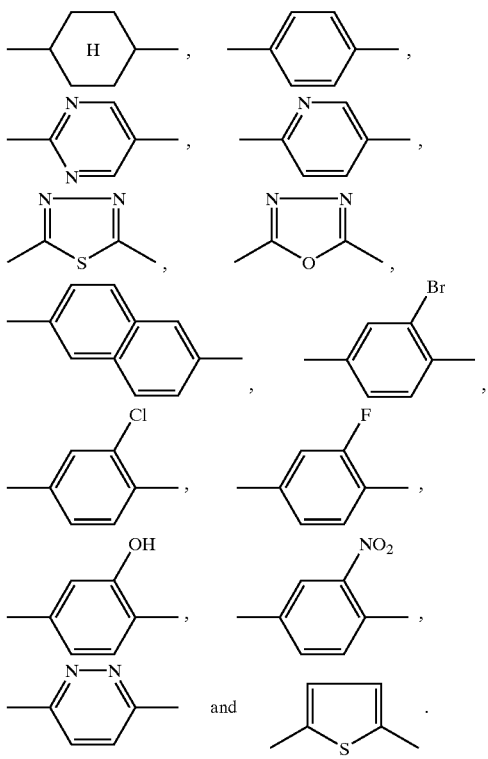

Examples of preferred mesogenic groups M are the following:

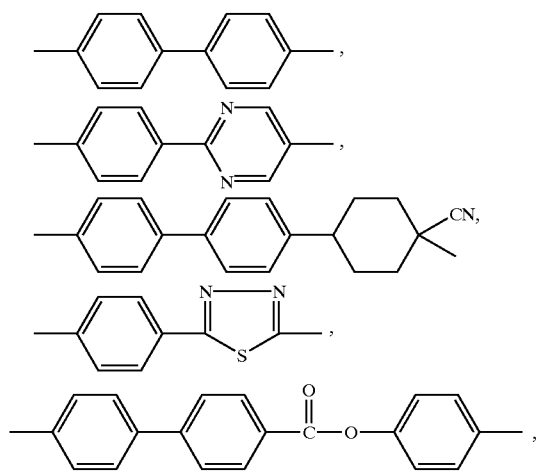

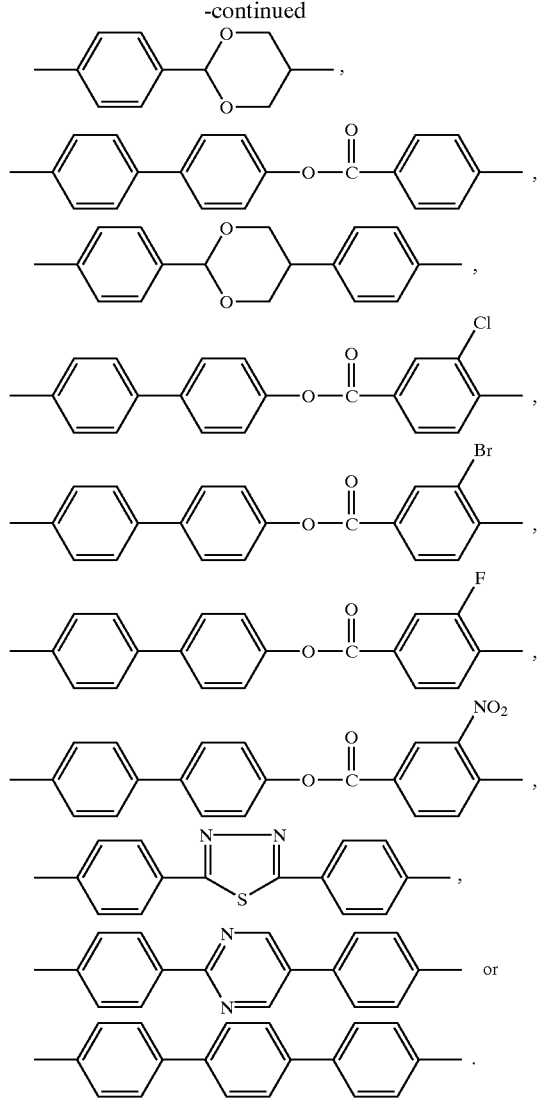

Particularly preferred mesogenic groups M are those of the following formulae:

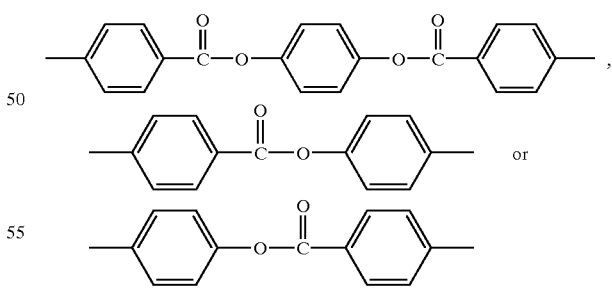

where each ring may carry up to three identical or different substituents from the following group:

$C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy, $C_1$–$C_{20}$-alkylcarbonylamino, formyl, halogen, cyano, hydroxyl and nitro.

Preferred substituents for the aromatic rings, besides fluorine, chlorine, bromine, cyano, formyl and hydroxyl, are in particular short-chain aliphatic radicals, such as methyl, ethyl, n-propyl, isopropyl, n-butyl, isobutyl, tert-butyl and alkoxy, alkoxycarbonyl, alkylcarbonyl, alkylcarbonyloxy, alkylcarbonylamino and monoalkylaminocarbonyl radicals containing these alkyl groups.

The outer benzene rings of the particularly preferred groups M preferably have the following substitution pattern:

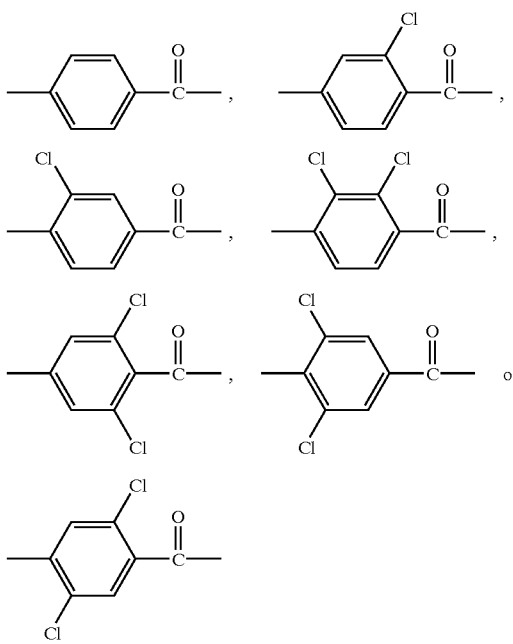

or they are substituted analogously by F, Br, $CH_3$, $OCH_3$, CHO, $COCH_3$, $OCOCH_3$ or CN in place of Cl, where the substituents may also be mixed. Mention should furthermore be made of the structures

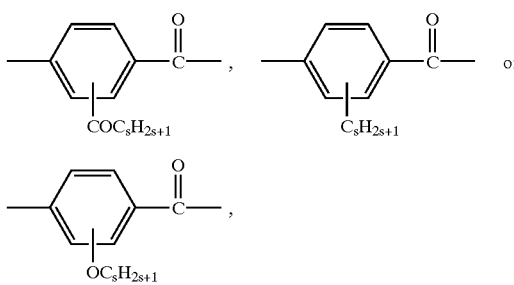

in which s is from 2 to 20, preferably from 8 to 15.

The preferred substitution patterns of the central benzene ring of the particularly preferred groups M are the following:

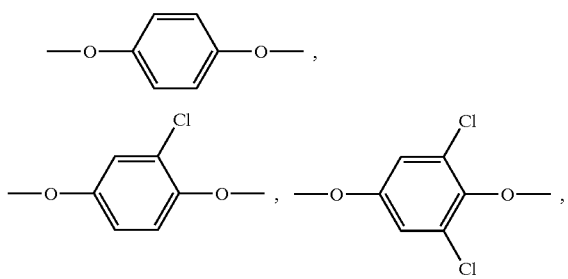

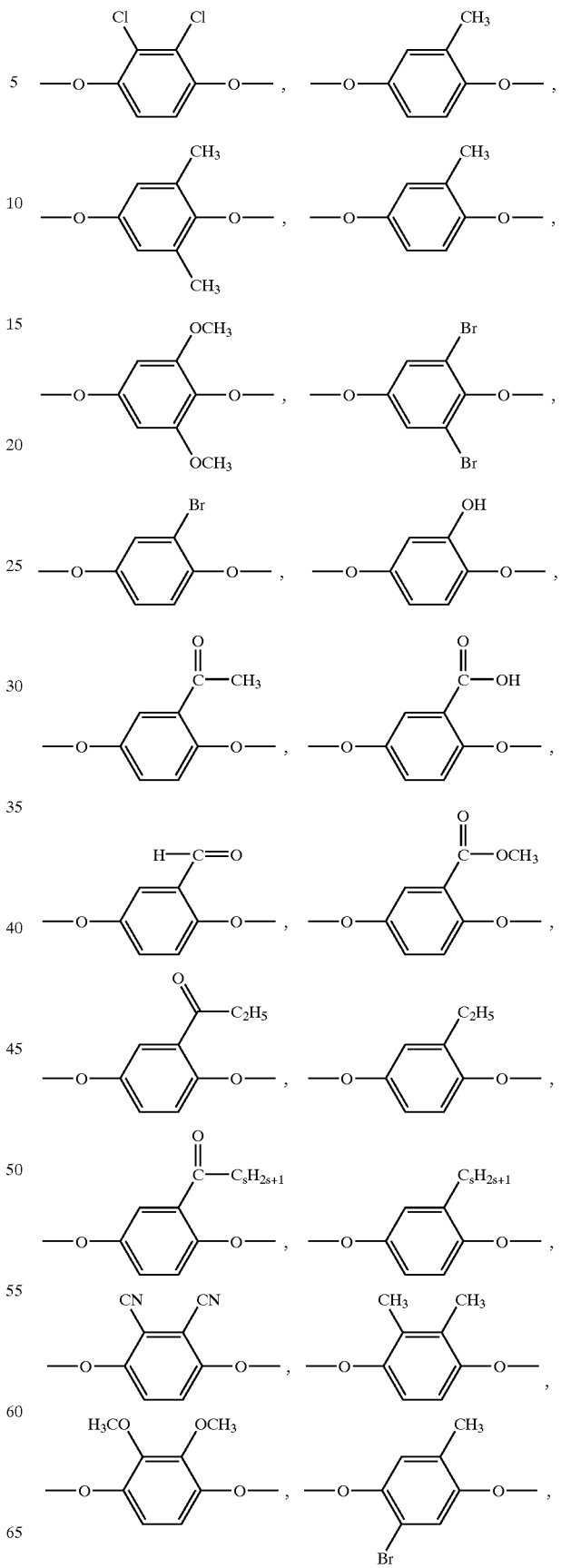

-continued

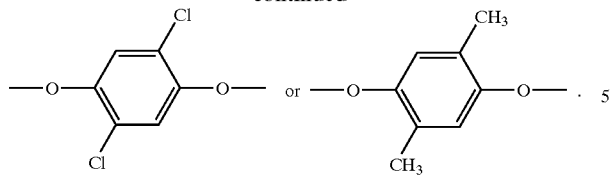

Preferred compounds I according to the invention are also those in which the radical pairs $Z^1$ and $Z^2$, $Y^1$ and $Y^2$, $Y^3$ and $Y^4$ and $A^1$ and $A^2$ are in each case identical.

Very particular preference is given to the mesogenic group M of the following formula:

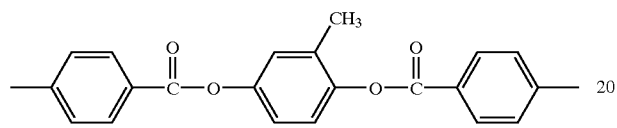

Mixtures of the compounds I according to the invention can also be prepared. Such mixtures usually have reduced viscosity compared with the pure mixture components and generally have lower liquid-crystalline phase temperatures, which means that they are in some cases suitable for applications at room temperature.

In the mixtures of the compounds according to the invention, not only, for example, "tricyclic", unsubstituted or ring-substituted mesogenic groups M of the formula

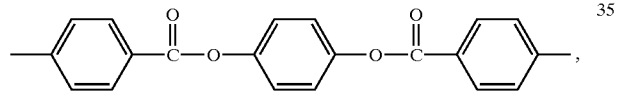

in which case, in the formula Ia, $Y^5$ is

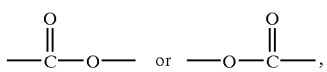

T is three identical, substituted or unsubstituted radicals

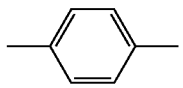

and
r is 2, can occur as molecular fragments, but also, for example, "bicyclic" groups M of the formulae

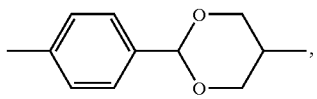

in which case, in the formula Ia, $Y^5$ is a single chemical bond,
T are different radicals

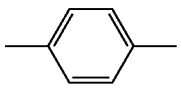

(unsaturated, isocyclic) and

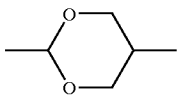

(saturated, heterocyclic), and
r is 1)
or

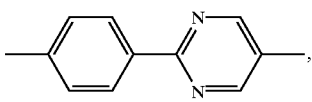

in which case, in the formula Ia
$Y^5$ is a single chemical bond,
T are different radicals

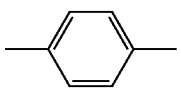

(unsaturated, isocyclic) and

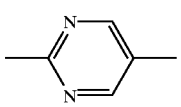

(unsaturated, heterocyclic), and
r is 1.

Particularly preferred "bicyclic" mesogenic groups M here are the fragments

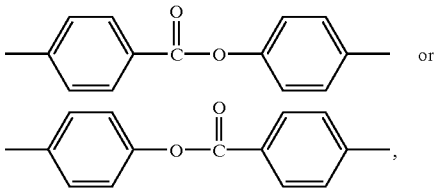

which may be additionally substituted on the aromatic rings as described above.

Liquid-crystal compositions which comprise one or more of the compounds of the formula I may additionally also comprise one or more chiral compounds. This gives rise to the formation of cholesteric liquid-crystalline phases, which, in particular, have interesting optical properties and, for example, reflect light of different wavelength depending on the viewing angle. Such liquid-crystal compositions are particularly suitable for use in optical elements.

Particularly suitable chiral components are those which on the one hand have a large twisting power and on the other hand are readily miscible with the liquid-crystalline compounds without interfering with the liquid-crystalline phase structure.

Preferred chiral compounds which are used, for example, in mixtures as in the above group b) are, for example, those of the general formulae Ib, Ic, Id and Ie:

$(Z^1-Y^5)_n X$ (Ib), $(Z^1-Y^1-A^1-Y^5)_n X$ (Ic), $(P^1-Y^5)_n X$ (Id), $(Z^1-Y^1-A^1-Y^3-M-Y^4)_n X$ (Ie), where the variables $A^1$, $Z^1$, $Y^1$, $Y^3$, $Y^4$, $Y^5$ and n are as defined above for the formula I, $P^1$ is a radical selected from hydrogen, $C_1$–$C_{30}$-alkyl, $C_1$–$C_{30}$-acyl, $C_3$–$C_8$-cycloalkyl, unsubstituted or substituted by one to three $C_1$–$C_6$-alkyl, and where the carbon chain of the alkyl, acyl and cycloalkyl radicals may be interrupted by ether oxygen, thioethersulfur or by non-adjacent imino or $C_1$–$C_4$-alkylimino groups, n is a number from 1 to 6, and X is an n-valent chiral radical.

Examples of radicals X are the following:

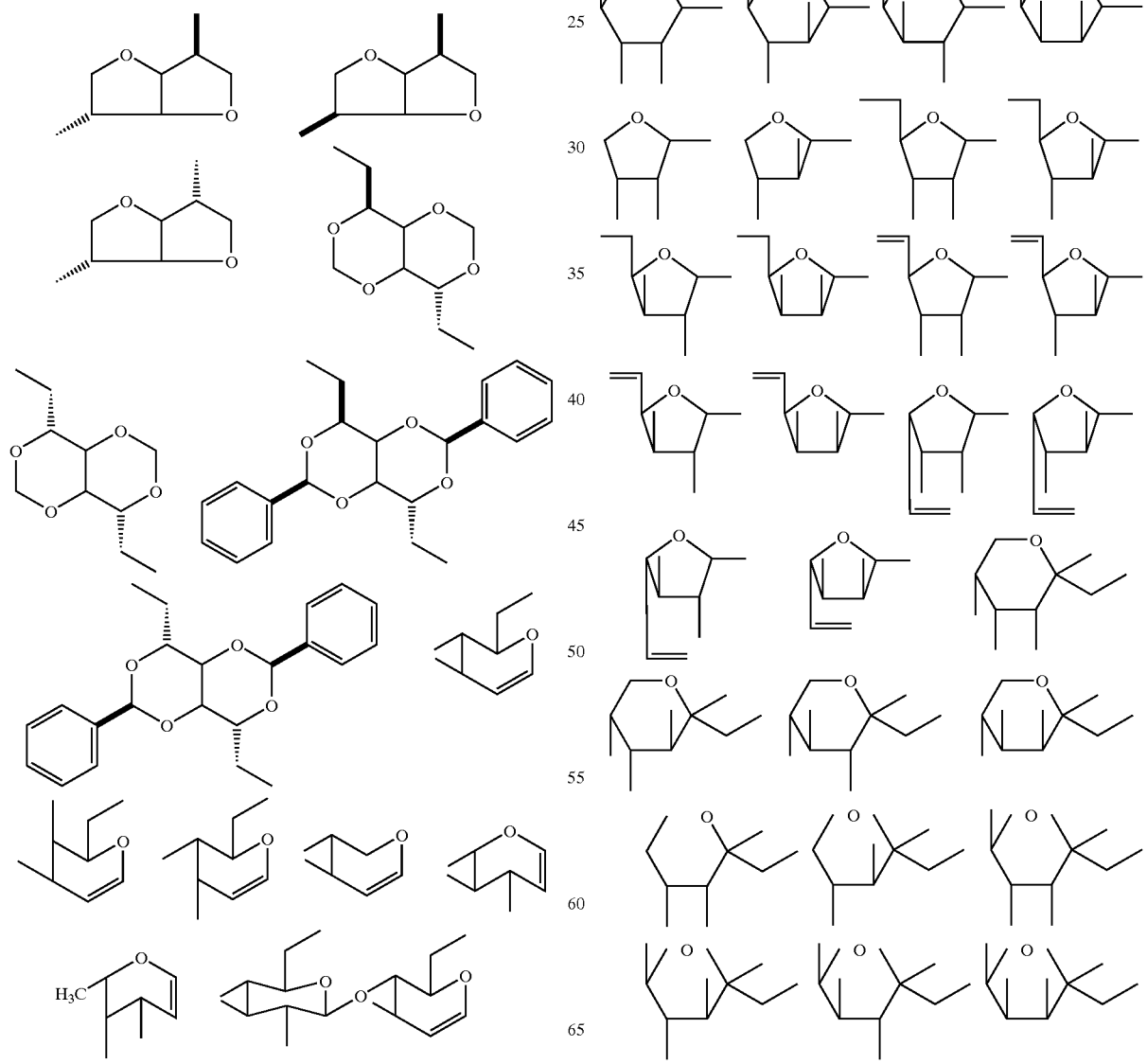

-continued

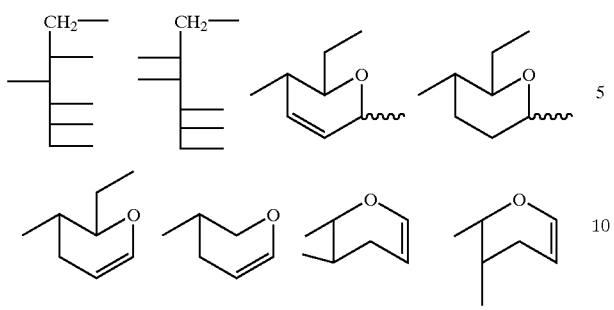

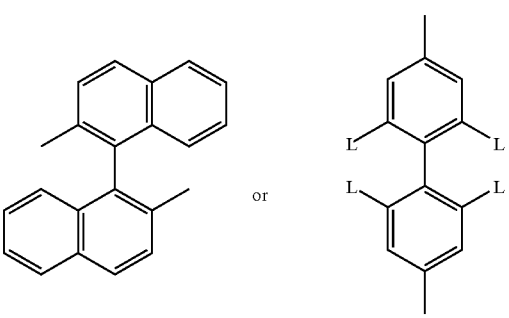

These and other preferred chiral components are mentioned, for example, in DE-A 43 42 280 and in German patent applications 19520660.6 and 19520704.1.

Other suitable radicals X are the following:

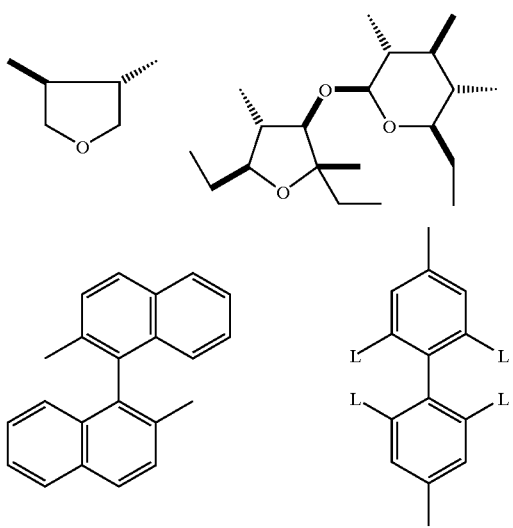

where

L is $C_1$- to $C_4$-alkyl, $C_1$–$C_4$-alkoxy, halogen, COOR, OCOR, CONHR or NHCOR, and R is $C_1$–$C_4$-alkyl.

(The terminal dashes in the above formulae indicate the free valences).

Particular preference is given, for example, to the following:

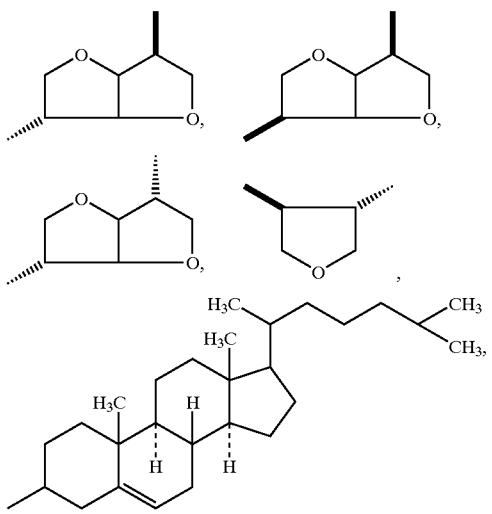

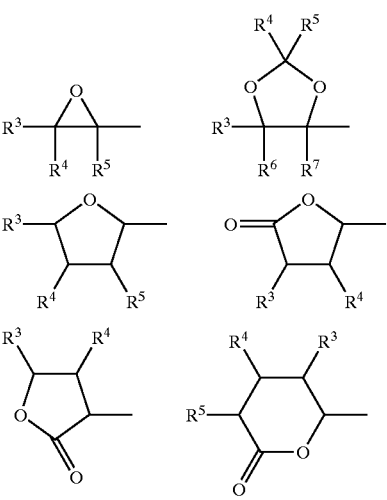

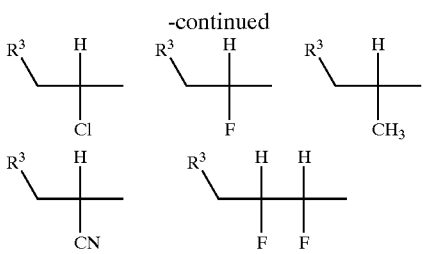

in which $R^3$, $R^4$, $R^5$, $R^6$ and $R^7$ are identical or different and are hydrogen, or a straight-chain or branched alkyl radical, with or without an asymmetrical carbon atom, having 1 to 16 carbon atoms, where one or more non-adjacent and non-terminal $CH_2$ groups may be replaced by O, and/or one or two $CH_2$ groups may be replaced by CH=CH—, or $R^4$ and $R^5$ together may also be —$(CH_2)_4$- or —$(CH_2)_5$- if they are bonded to an oxirane, dioxolane, tetrahydrofuran, tetrahydropyrane, butyrolactone or valerolactone system.

Particularly preferred chiral components are the following compounds (A) to (G):

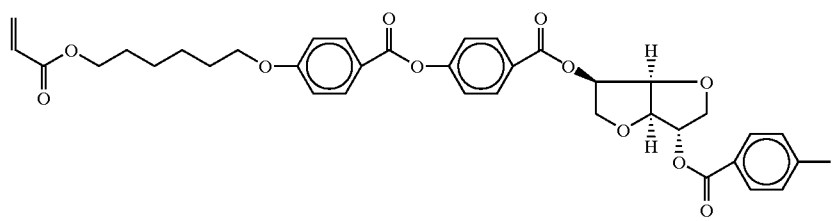

(A)

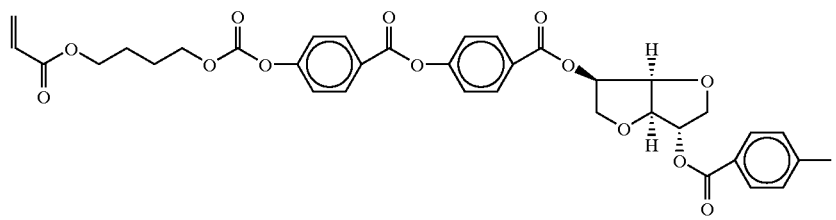

(B)

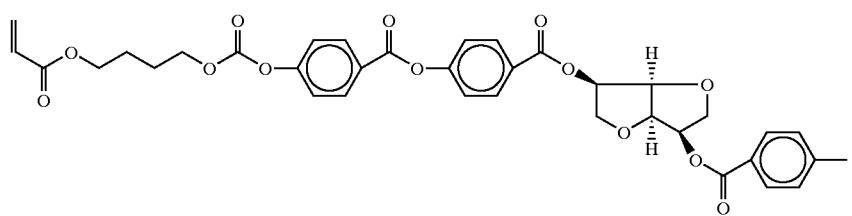

(C)

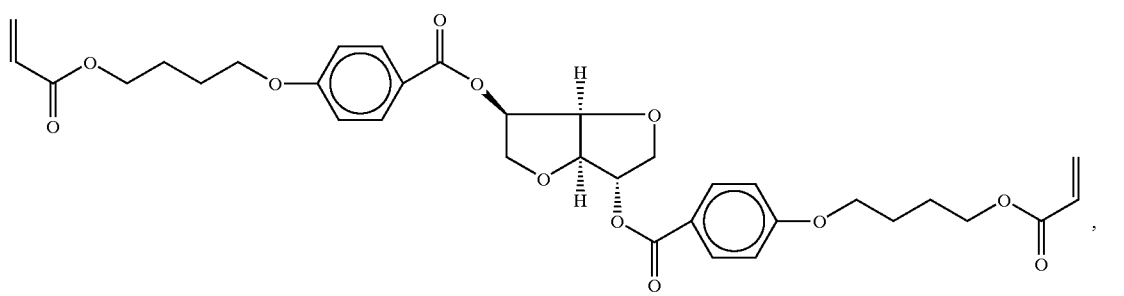

(D)

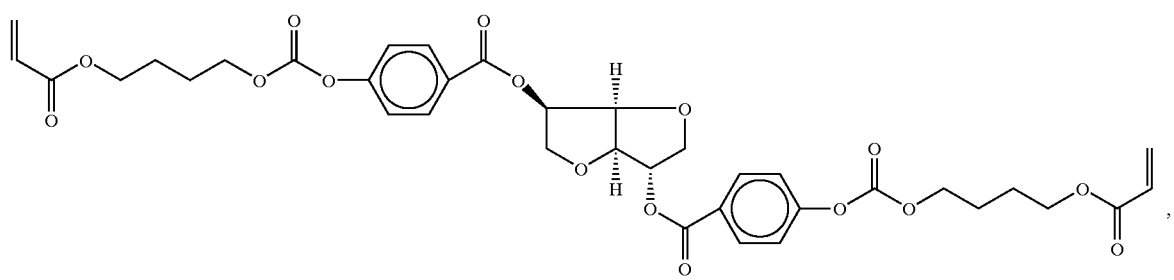
(E)
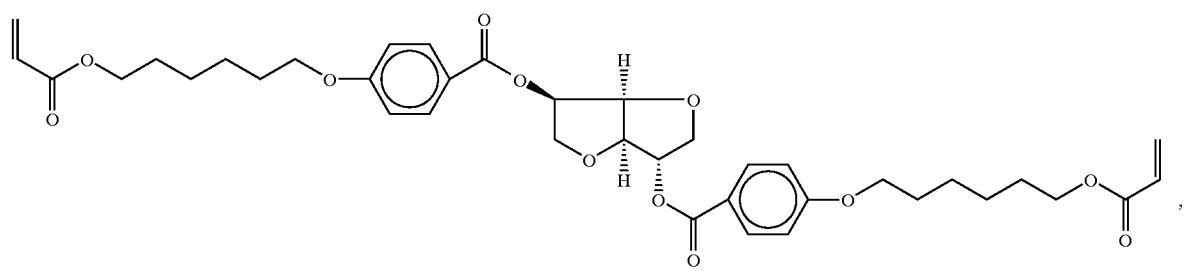
(F)
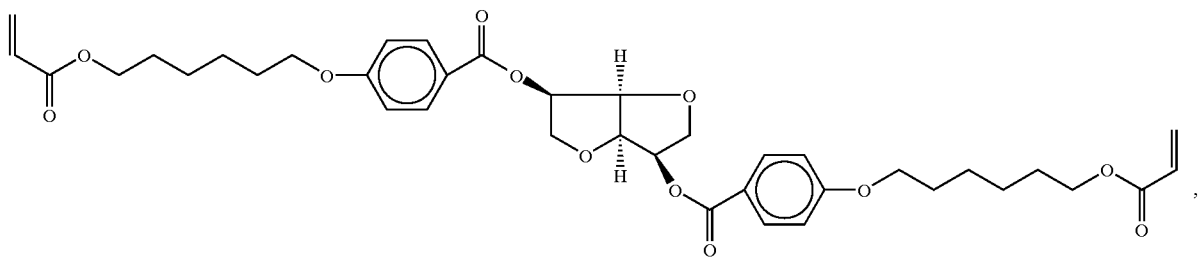
(G)
The following compounds of the formulae (H) and (K) may be mentioned as non-limiting examples of suitable nematic compounds:
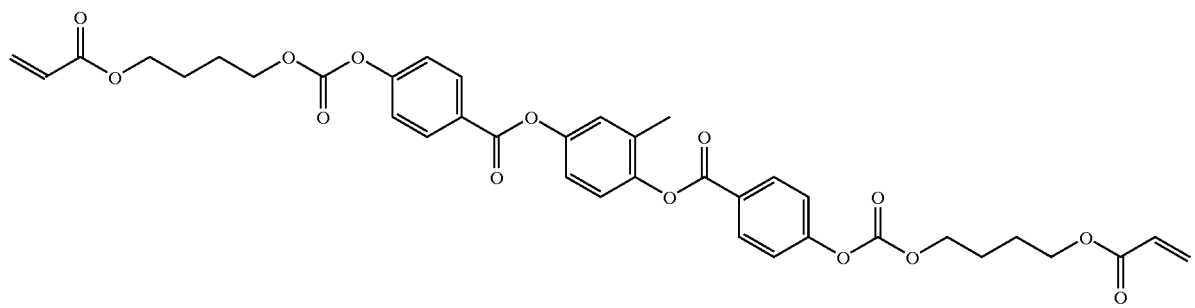
(H)
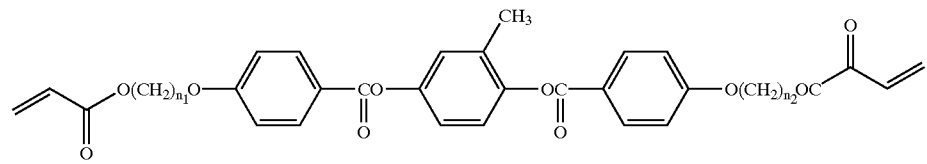
(K)

in which $n_1$ and $n_2$, independently of one another, are 2, 3, 4 or 6, where the monomer of the formula (K) is preferably employed in the form of a mixture of compounds where $n_1/n_2$ is 2/3, 2/4, 2/6, 3/4, 3/6, 4/4, 4/6, 6/4 and 6/6. In the compounds of the formulae (H) and (K), the methyl substituent on the central benzene ring may also, if desired, be replaced by a hydrogen atom.

If the compounds or liquid-crystal compositions according to the invention are polymerized, the liquid-crystalline ordered state can be fixed. The polymerization can be carried out, for example, thermally or photochemically, depending on the polymerizable group. Together with the compounds or liquid-crystal compositions according to the invention, other monomers can also be copolymerized. These monomers may be other polymerizable liquid-crystalline compounds, chiral compounds which are likewise preferably copolymerized covalently, or conventional crosslinking agents, such as polyvalent acrylates, vinyl compounds or epoxides. Particularly in the case of isocyanates, isothiocyanates or epoxides as polymerizable liquid-crystal compounds, the crosslinking agent is preferably a polyvalent alcohol, so that, for example, urethanes can be formed. The crosslinking agent must be matched in amount to the polymerization conditions in such a way that firstly satisfactory mechanical stability is achieved, but secondly the liquid-crystalline phase behavior is not impaired. The amount of crosslinking agent therefore depends on the specific application of the polymers. For the preparation of pigments, a larger amount of crosslinking agent is advantageous, while for the production of thermoplastic layers or, for example, for display alignment layers, a smaller amount of crosslinking agent is necessary. The amount of crosslinking agent can be determined by a few preliminary experiments.

A further modification of the polymerization product prepared from the compounds or liquid-crystal compositions according to the invention is possible through the addition of polymeric auxiliaries before the polymerization. Such auxiliaries should preferably either be soluble in the starting mixtures or alternatively in an organic solvent which is compatible with the starting mixtures. Typical representatives of such polymeric auxiliaries are, for example, polyesters, cellulose esters, polyurethanes and polyether- or polyester-modified or even unmodified silicones. The amount of polymeric auxiliary which may have to be added for the desired purpose, its chemical nature and possibly the amount and type of solvent are generally familiar to the person skilled in the art or can likewise be determined experimentally by means of a few preliminary experiments.

Besides the compounds of the formulae Ia to Ie, further compounds which are incorporated non-covalently into the polymeric network can also be admixed. These can be, for example, commercially available nematic liquid crystals.

Further additives can also be pigments, dyes and fillers.

The pigments can be inorganic compounds, for example iron oxides, titanium oxide and carbon black, and the organic compounds can be, for example, pigments or dyes from the classes of the monoazo pigments, monoazo dyes and metal salts thereof, disazo pigments, condensed disazo pigments, isoindoline derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or basic dyes, such as triarylmethane dyes, and salts thereof.

Before application, the liquid-crystalline materials are dissolved in a readily volatile solvent and, if desired, combined with necessary additives. The additives employed can be polymerization inhibitors or initiators, flow-control agents, deaerating agents, adhesives, binders, dispersants, etc.

The cholesteric layers and any release layer present are produced by applying a layer of an optionally reactive, pourable cholesteric mixture, preferably by pouring, onto a support, preferably a mobile support, and forming a solid cholesteric layer. The reactive, pourable cholesteric mixture is preferably applied in the isotropic phase. In a preferred embodiment, the reactive, pourable cholesteric mixture is diluted before pouring and forms the solid cholesteric layer where appropriate with removal of the diluent (during or after). The formation of the solid cholesteric layer can take place by crosslinking, by polymerization or by rapid cooling to below the glass transition temperature (freezing of the cholesteric phase), where the term "crosslinking" is taken to mean the covalent linking of polymeric compounds, and the term "polymerization" is taken to mean the covalent linking of monomeric compounds to form polymers. The term "curing" is taken to mean crosslinking, polymerization or freezing of the cholesteric phase. For the purposes of the present invention, a mixture is referred to as reactive if at least one compound present in the mixture is capable of forming covalent linkages.

The mobile support is preferably strip-shaped and consists, for example, of a web of metal foil, paper or plastic film. The cholesteric mixture is preferably applied with a proportion of diluent of from about 5 to 95% by weight, in particular from about 30 to 80% by weight, in particular from about 40 to 70% by weight, particularly preferably from about 55 to 60% by weight, in each case based on the total weight of the mixture to be applied.

Examples of diluents which can be employed in the process according to the invention are linear or branched esters, especially esters of acetic acid, such as ethyl and butyl acetate, cyclic ethers and esters, alcohols, lactones, aliphatic and aromatic hydrocarbons, such as toluene, xylene and cyclohexane, and ketones, amides, N-alkylpyrrolidones, especially N-methylpyrrolidone, and in particular tetrahydrofuran (THF), dioxane and methyl ethyl ketone (MEK). Preference is given to organic diluents having a boiling point of below 140° C.

Further examples of suitable diluents are ethers and cyclic ethers, such as tetrahydrofuran or dioxane, chlorinated hydrocarbons, such as dichloromethane, 1,1,2,2-tetrachloroethane, 1-chloronaphthalene, chlorobenzene or 1,2-dichlorobenzene. These diluents are particularly suitable for polyesters and polycarbonates. Suitable diluents for cellulose derivatives are, for example, ethers, such as dioxane, or ketones, such as acetone. If copolyisocyanates are employed as group d) polymers, it is appropriate to use polymerizable diluents, as described in U.S. Pat. No. 8,834,745. Such polymerizable diluents are, for example esters of $\alpha,\beta$-unsaturated mono- or dicarboxylic acids, in particular $C_3$–$C_6$-mono- or -dicarboxylic acids, with $C_1$–$C_{12}$-alkanols, $C_2$ $C_{12}$-alkanediols or $C_1$–$C_6$-alkyl ethers and phenyl ethers thereof, for example acrylates and methacrylates, hydroxyethyl or hydroxypropyl acrylate or methacrylate, and 2-ethoxyethyl acrylate or methacrylate;

vinyl $C_1$–$C_{12}$-alkyl ethers, such as vinyl ethyl ether, vinyl hexyl ether or vinyl octyl ether;

vinyl esters of $C_1$–$C_{12}$-carboxylic acids, such as vinyl acetate, vinyl propionate and vinyl laurate;

$C_3$–$C_9$-epoxides, such as 1,2-butylene oxide and styrene oxide;

N-vinylpyrrolidone, N-vinylcaprolactam and N-vinylformamide;

vinylaromatic compounds, such as styrene, α-methylstyrene and chlorostyrene, and compounds containing two or more crosslinkable groups, such as diesters of diols (including polyethylene glycols) with acrylic or methacrylic acid or divinylbenzene.

Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures too can contain small amounts of polymerizable diluents in addition to the inert diluent. Preferred polymerizable solvents which can be added are acrylates, in particular acrylates of higher functionality, such as bis-, tris- or tetraacrylates, particularly preferably high-boiling oligoacrylates. The preferred amount added is about 5% by weight, based on the total weight of the mixture.

If desired, water can also be added to the diluent or even employed as the only diluent.

The crosslinkable or polymerizable mixture can contain commercially available photoinitiators for the photochemical polymerization. These are not necessary for curing by electron beams. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenyl-acetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylamine-benzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

The brightness of the pigment layer can be increased by addition of small amounts of suitable flow-control agents. From about 0.005 to 1% by weight, in particular from 0.01 to 0.5% by weight, based on the amount of cholesteric compound employed, can be used. Suitable flow-control agents are, for example, glycols, silicone oils and in particular acrylate polymers, such as the acrylate copolymers available under the name Byk 361 or Byk 358 from Byk-Chemie, and the modified silicone-free acrylate polymers available under the name Tego flow ZFS 460 from Tego.

If desired, the polymerizable or crosslinkable mixture can also contain stabilizers against UV and weathering effects. Examples of compounds which are suitable for this purpose are derivatives of 2,4-dihydroxybenzophenone, derivatives of 2-cyano-3,3-diphenyl acrylate, derivatives of 2,2',4,4'-tetrahydroxy-benzophenone, derivatives of ortho-hydroxyphenylbenzotriazole, salicylates, ortho-hydroxyphenyl-s-triazines or sterically hindered amines. These substances can be employed alone or preferably in the form of mixtures.

The pourable, reactive cholesteric mixture preferably has a viscosity in the range from 0.1 to 50 mPas, in particular from about 1 to 10 mPas, measured at 23° C.

The cholesteric mixture is particularly preferably applied to the support at a rate of from about 1 to 800 m/min, in particular from about 5 to 100 m/min.

In a preferred embodiment of the process, the mixture is applied to the substrate by means of a roll coater, reverse roll coater, knife reverse roll coater, slot die, a kiss coater or in particular by means of an extrusion coater, doctor coater or knife coater, very particularly preferably by means of a doctor coater or knife coater.

The mixture is advantageously applied by means of a coating device which subjects the mixture to high shear gradients during application. Measures for influencing the shear gradient are familiar to the person skilled in the art, who is familiar with coating devices.

Preference is given to a coating device whose coating gap width is in the range from about 2 to 50 µm, in particular from about 4 to 15 µm. It is also advantageous to work at a coater excess pressure of from about 0.01 to 0.7 bar, preferably from 0.05 to 0.3 bar.

Particularly suitable apparatuses for the production of cholesteric layers are coating machines having a knife coater applicator with which a cholesteric mixture can be applied to a support film transported over a roll rotating with very high precision. The coating knife is advantageously mounted on a precision sledge, so that a defined gap against the support film can be set precisely.

The applied layer is dried by means of a drying device, for example by means of a circulated-air dryer, and subsequently, or instead of the drying, polymerized or crosslinked thermally, by UV radiation or by electron beams, curing by UV radiation or by electron beams being preferred.

The applied layer is preferably dried to a residual content of volatile diluents of less than 1% by weight, based on the dry weight of the applied layer. The drying is preferably carried out at a temperature in the range from 20 to 100° C. for a period of from about 1 to 120 seconds. The optimum drying conditions here can be matched to the layer thickness and coating rate used in each case. In this way, for example, cured cholesteric layers having a mean dry layer thickness of from 0.2 to 1 µm are obtained. The minimum dry thickness corresponds to the pitch height, i.e. the ratio of reflection wavelength to refractive index.

The cholesteric layers produced in accordance with the invention have a mean layer thickness variation of 50 nm or less, for example less than 40, 30, 20 or 10 nm, which results in high color constancy of the cholesteric layer. The mean layer thickness variation can be determined in a simple manner, for example microscopically from thin sections. A suitable determination method can be carried out, for example, in accordance with the method described in EP-A-0 566 100.

Other binders which can be employed for the release layer and for the cholesteric layers are monomeric agents and mixtures thereof with polymeric binders. Suitable monomeric agents are preferably those containing two or more crosslinkable groups, such as acrylic, methacrylic, α-chloracrylic, vinyl, vinyl ether, epoxide, cyanate, isocyanate or isothiocyanate groups. Particular preference is given to acrylic, methacrylic and vinyl ether groups. Monomeric agents containing two crosslinkable groups are, for example, the diacrylates, the divinyl ethers and the dimethacrylates of diols, for example propanediol, butanediol, hexanediol, ethylene glycol, diethylene glycol, triethylene glycol or tetrapropylene glycol.

Monomeric agents containing three crosslinkable groups are, for example, the triacrylates, the trivinyl ethers and the trimethacrylates of triols, for example trimethylolpropane, ethoxylated trimethylolpropane having 1 to 20 ethylene oxide units, propoxylated trimethylolpropane having 1 to 20 propylene oxide units, mixed ethoxylated and propoxylated trimethylolpropane, in which the total amount of ethylene oxide units and propylene oxide units is from 1 to 20. Examples of other monomeric agents containing three crosslinkable groups are the triacrylates, the trivinyl ethers and the trimethacrylates of glycerol, ethoxylated glycerol having 1 to 20 ethylene oxide units, propoxylated glycerol having 1 to 20 propylene oxide units, and mixed ethoxylated and propoxylated glycerol in which the total number of ethylene oxide units and propylene oxide units is from 1 to 20.

Monomeric agents containing four crosslinkable groups are, for example, the tetraacrylates, the tetravinyl ethers and the tetramethacrylates of tetraols, for example bistrimethylolpropane, ethoxylated bistrimethylolpropane having 1 to 20 ethylene oxide units, propoxylated bistrimethylolpropane having 1 to 20 propylene oxide units, and mixed ethoxylated and propoxylated bistrimethylolpropane in which the total amount of ethylene oxide units and propylene oxide units is from 1 to 20. Other monomeric agents containing four crosslinkable groups are, for example, the tetraacrylates, the tetravinyl ethers and the tetramethacrylates of tetraols, for example pentaerythritol, ethoxylated pentaerythritol having 1 to 20 ethylene oxide units, propoxylated pentaerythritol having 1 to 20 propylene oxide units, and mixed ethoxylated and propoxylated pentaerythritol in which the total amount of ethylene oxide units and propylene oxide units is from 1 to 20.

In order to increase reactivity in the crosslinking or polymerization in air, the binders and monomeric agents can comprise from 0.1 to 10% of a primary or secondary amine.

Examples of suitable amines are ethanolamine, diethanolamine and dibutylamine.

The pigment-containing compositions can be prepared by conventional dispersion methods known to the persons skilled in the art using diluents, dispersants, photoinitiators and, if desired, further additives.

Diluents which can be used are water or organic liquids or mixtures thereof, organic liquids being preferred. Particular preference is given to organic liquids having a boiling point of below 140° C., in particular ethers, such as tetrahydrofuran, ketones, such as ethyl methyl ketone, and esters, such as butyl acetate.

Dispersants which can be used are low-molecular-weight dispersants, for example stearic acid, or polymeric dispersants. Suitable polymeric dispersants or dispersion resins are known to the person skilled in the art. Particular mention should be made of polyurethanes containing sulfonate groups, phosphate groups, phosphonate groups or carboxyl groups, vinyl chloride copolymers containing carboxyl groups, and polyimine polyesters and polyether acrylates with or without incorporated functional groups.

Crosslinkable or polymerizable pigment-containing formulations can be prepared using the photoinitiators which are commercially available for photochemical polymerization, for example the photoinitiators listed above for the photochemical polymerization of the cholesteric mixtures.

The layer materials and pigments according to the invention can basically have the following layer sequence:

1) if desired, a first support
2) if desired, a release layer,
3) at least one cholesteric color-effect layer,
4) if desired, a layer which partially or completely absorbs transmitted light,
5) if desired, a second support applied subsequently to the cholesteric layer, for example by lamination.

Preferred supports are known, preferably thermoplastic films made from polyesters, such as polyethylene terephthalate or polyethylene naphthalate, and polyolefins, cellulose triacetate, polycarbonates, polyamides, polyimides, polyamidoimides, polysulfones, aramids or aromatic polyamides. The thickness of the support is preferably from about 5 to 100 μm, in particular from about 10 to 20 μm. The support can have been subjected to coating, prior to corona discharge treatment, plasma treatment, slight adhesion treatment, heat treatment, dust removal treatment or the like. The support preferably has a mean center-line surface roughness of 0.03 μm or less, in particular 0.02 μm or less, particularly preferably 0.01 μm or less. The roughness profile of the surface of the support can be varied by means of fillers added to the layer support during its production. Examples of suitable fillers are oxides and carbonates of Ca, Si and Ti, and organic fine powders of acrylic substances.

The support can also be a metallized film or a preferably polished metal band, which can, for example, also be in the form of a continuous band.

The process for the production of a cholesteric layered material according to the invention is preferably carried out as follows:

a) In a first step, a release layer is applied to a layer support by means of one of the above-mentioned coating devices, dried and cured. The layer thickness of this release layer is from about 0.5 to 20 μm, in particular from about 0.5 to 10 μm, particularly preferably from about 0.5 to 3 μm. The release layer can be a cholesteric layer or a binder-containing layer containing a binder which is cured or crosslinked by known methods. The pourable mixture for the release layer preferably has a viscosity in the range from about 1 to 500 mPas, in particular from about 10 to 100 mPas, measured at 23° C. The mixture is particularly preferably applied to the layer support at a rate of from about 1 to 800 meters per minute, in particular from about 5 to 100 meters per minute. The curing or crosslinking is preferably carried out by electron beam or UV irradiation.

The adhesion of the release layer to the support is at least 1 cN, preferably at least 3 cN, particularly preferably at least 10 cN, which can be set by adjusting the temperature and irradiation intensity during crosslinking. In the case of UV curing, the temperature of the layer to be cured is at least 80° C., preferably at least 90° C., and the irradiation duration is in the range from 5 to 500 ms, at an emitter power of from about 50 to 200 watts/cm.

The setting of high adhesion is associated with two advantages:
  interfering diffusion of constituents of the support or release layer into the overlying cholesteric layers does not occur;
  after detachment of the cholesteric layers from the release layer remaining on the support, the release layer can be used for further coating operations.

b) A first cholesteric layer containing the desired cholesteric compound or mixture is subsequently applied to the release layer, dried and cured. The coating composition used for the production of the cholesteric layer preferably has a comparable or identical composition to the coating composition of the release layer. The dry layer thickness of this layer is, for example, in the range from about 0.2 to 1 μm, and the minimum layer thickness corresponds to the pitch height.

c) In a next step, a second cholesteric layer is, if desired, applied to the first cholesteric layer, where the layer thickness is set as in b), then dried and cured as in b). The casting operation is preferably carried out analogously to the production of b). Any desired number of further cholesteric layers can be applied analogously in this way.

The drying conditions for the drying of the release layers are not important since high interference line homogeneity is not important for these layers. By contrast, the drying conditions for the cholesteric layers are set in such a way that optimum interference line homogeneity is achieved.

The curing or crosslinking of the cholesteric layers is preferably carried out under the same conditions as for the release layer. A value results for the adhesion of each of the cholesteric layers to the next lower layer, i.e., for example, the release layer or another cholesteric layer, which is in the range less than 1 cN, preferably in the range from 0.1 to 0.8 cN. The cholesteric layers can thus, surprisingly, easily be separated from the release layer and, where appropriate, from one another. By varying the irradiation intensity and/or temperature, the adhesion of the cholesteric layers to one another can be set as needed.

d) The cholesteric layers can subsequently be detached from the supported layer and processed further.

The detachment of the cholesteric multilayer structure from the first release layer can be carried out, for example, by passing the composite over a deflection roll of small diameter. As a consequence, the crosslinked cholesteric material delaminates from the release layer. Other known methods are also suitable, for example peeling off the layer support via a sharp edge, scratching the surface of the layer package by means of an air knife and subsequently blowing by means of compressed air or a jet of water or steam, ultrasound, mechanical removal, for example by means of a doctor blade, or combinations thereof.

The cholesteric multilayer material, which now has no support, can, if desired, be converted into a multilayer pigment by comminution to the desired particle size. This can be carried out, for example, by grinding in a universal mill. The comminuted pigments can subsequently be classified in order to narrow the particle-size distribution, for example by means of a sieving process.

The invention is now explained in greater detail with reference to the attached drawings, in which:

FIG. 1 shows the TEM micrograph of a single cholesteric layer (d=4.8 μm) with a highly inhomogeneous interference line pattern.

Figure 2:
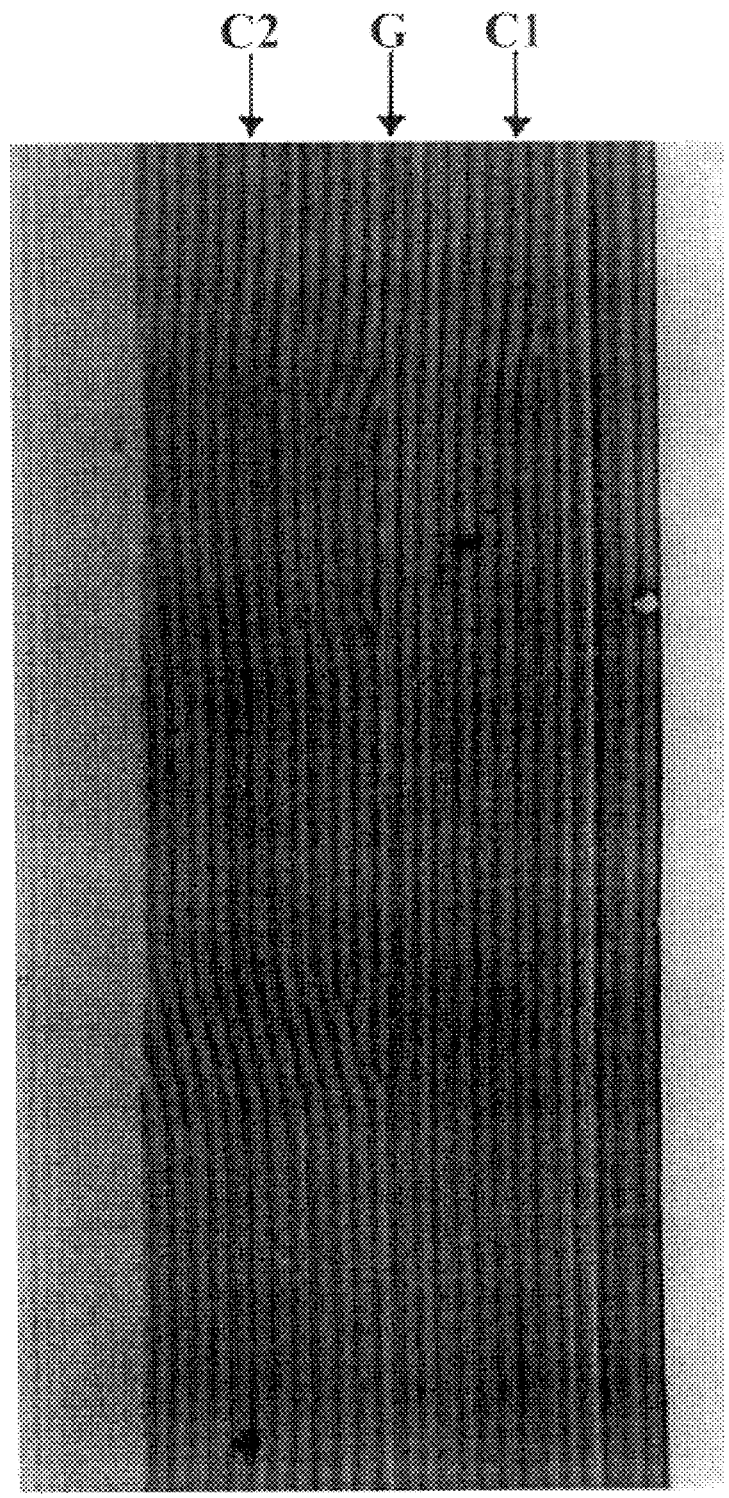
FIG. 2 shows the TEM micrograph of a double cholesteric layer with a slightly inhornogeneous interference line pattern.

FIG. 2 shows the TEM micrograph of a double cholesteric layer (d=2×2.4 μm) with a slightly inhomogeneous interference line pattern, C1=1$^{st}$ cholesteric layer, C2=2$^{nd}$ cholesteric layer, G=interface.

Figure 3:
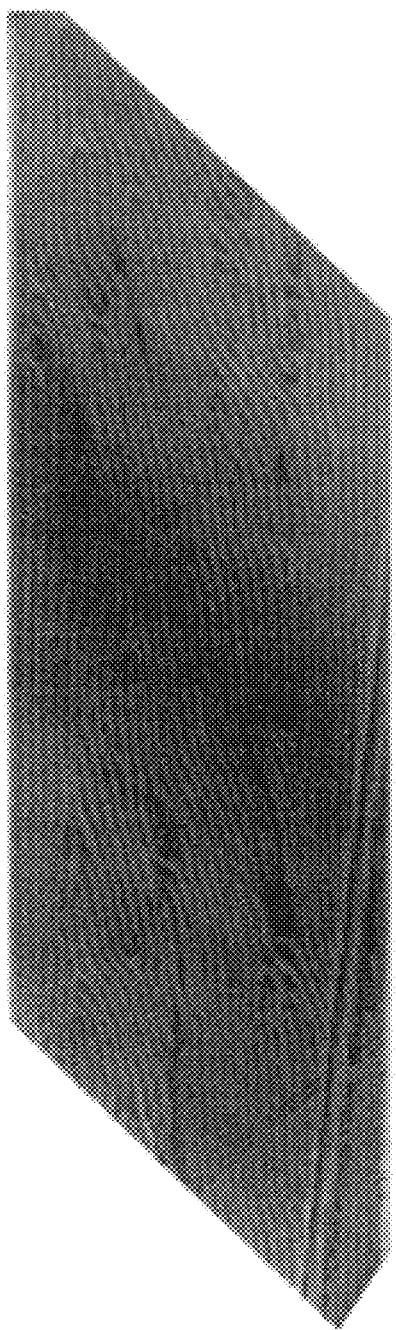
FIG. 3 shows the TEM micrograph of a commercially available pigment.

FIG. 3 shows the TEM micrograph of a commercially available pigment with clearly visible interference line inversions and eye formations.

Figure 4:
FIG. 4 shows the TEM micrograph of a single layer according to the invention.

FIG. 4 shows the TEM micrograph of a single layer according to the invention (d=0.9 μm) with a homogeneous interference-line pattern (a slight vertical offset, which, however, does-not significantly impair the brightness, is evident at the upper end of the layer).

Figure 5:
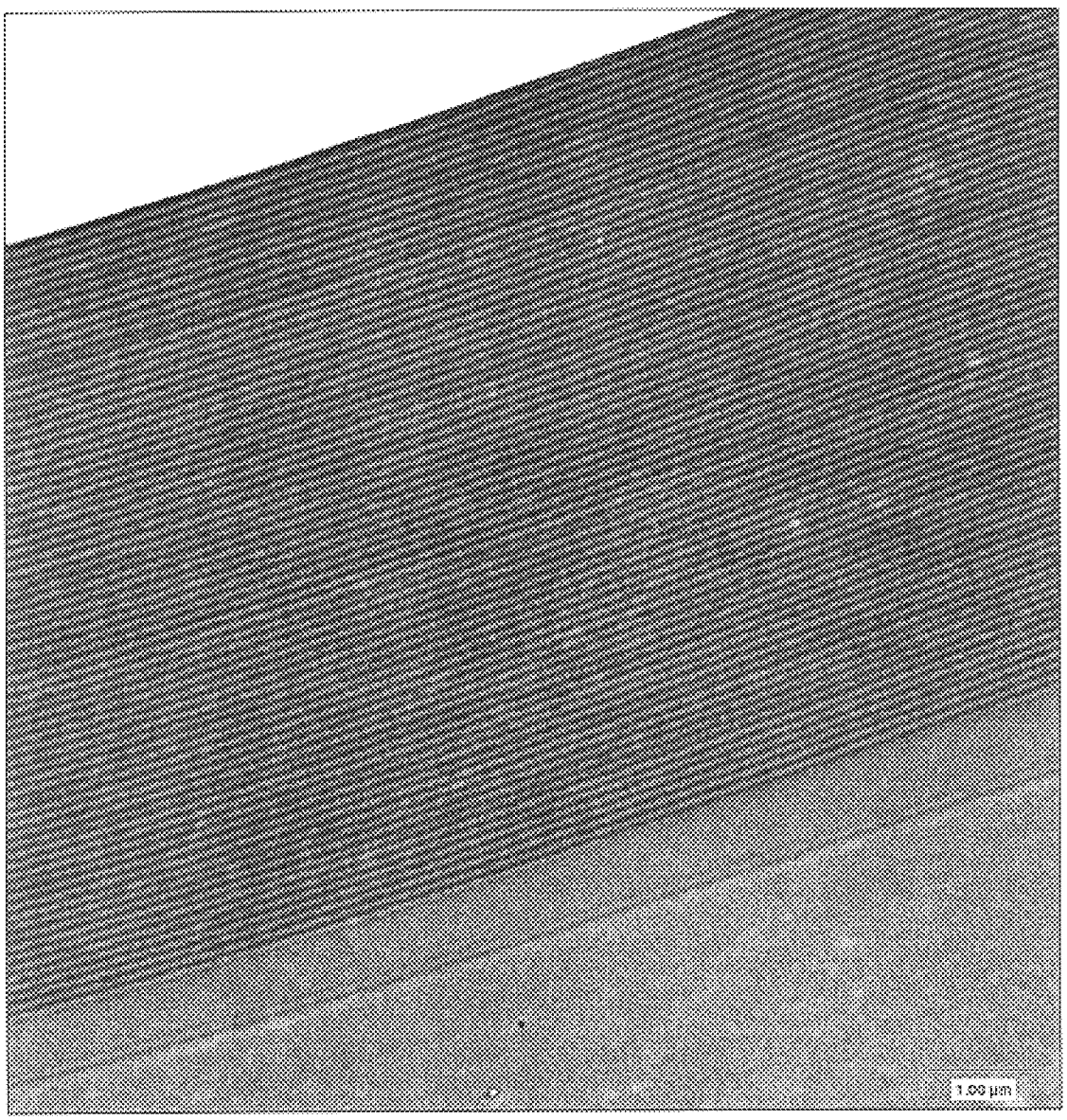
FIG. 5 shows the TEM micrograph of a multilayer structure according to the invention.
Figure 6A:
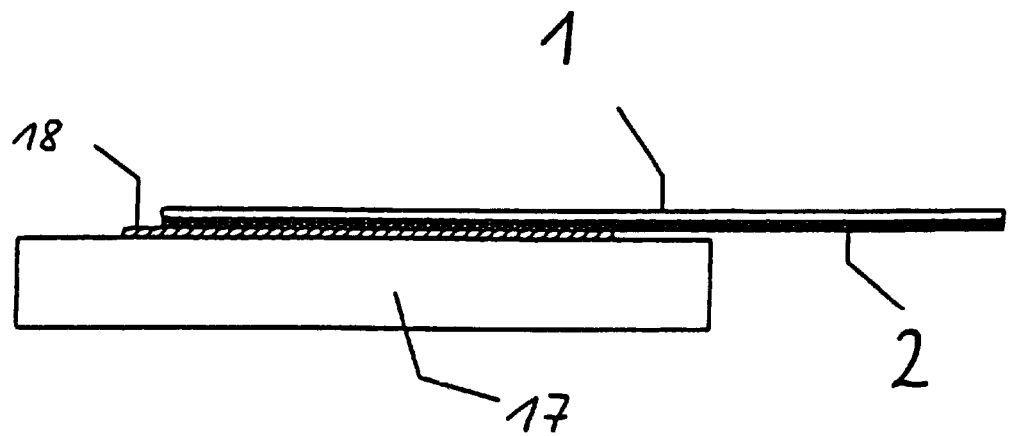
FIGS. 6A–6D show the method of measuring the adhesive strength of a cholesteric layer.
Figure 6B:
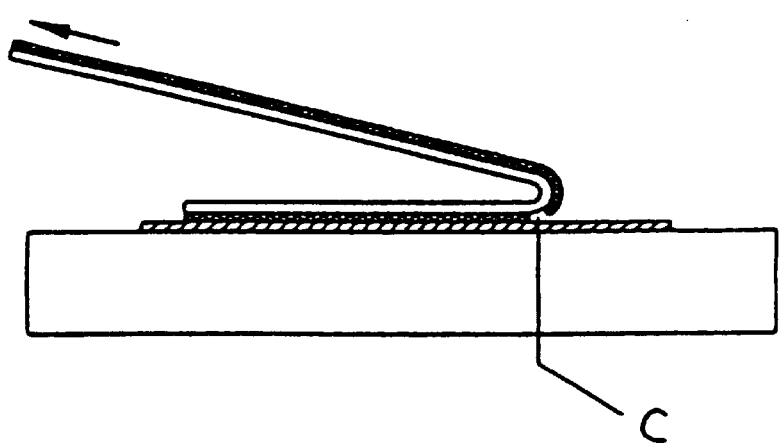
Figure 6C:
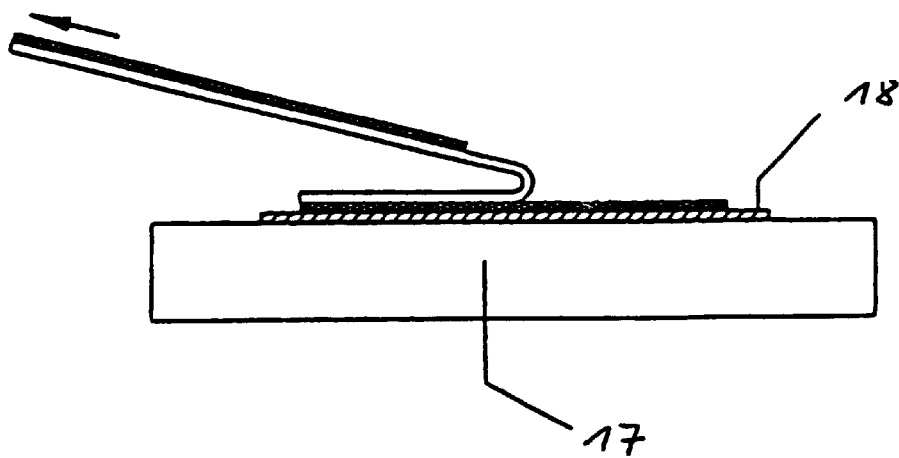
Figure 6D:
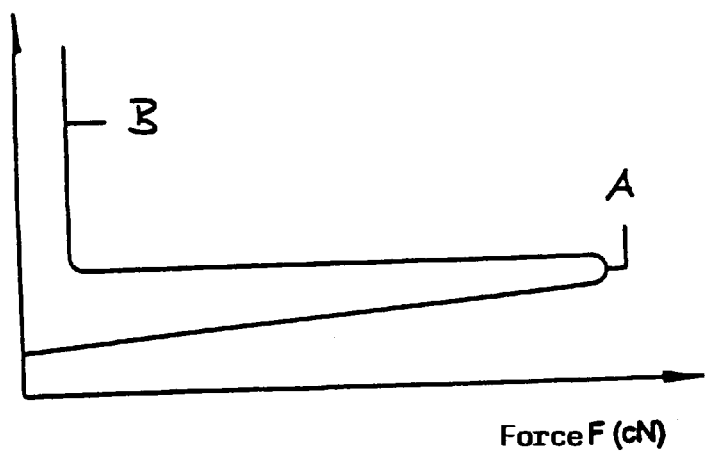

FIG. 5 shows the TEM micrograph of a multilayer structure according to the invention (8 layers each with a thickness of 0.9 μm) with a homogeneous interference line pattern.

FIG. 6 shows the measurement of the adhesion. An approximately cm long piece of adhesive tape 18 is fixed to a flat metal plate 17. The adhesive tape 18 used can be any commercially available adhesive tape which gives an adhesion, under otherwise identical measurement conditions, of from about 7.3 to 7.9 cN, in particular about 7.6 cN, with a PET reference film. The PET reference film used here is a PET film, type E2R, from Teijin, thickness 9 μm, width 6.35 mm, surface roughness in accordance with DIN 4768: Rz=0.86 μm, in accordance with DIN 4768/1: Ra=0.012 μm, in accordance with EP-B-0 032 710 (interference contrast method): from 75 to 125 nm. The adhesive layer faces upward and away from the plate. The composite to be measured, consisting of the layer support 1 and the cholesteric layer 2, is applied in such a way that a cholesteric layer 2 comes into contact with the adhesive layer of the adhesive tape 18, as shown in FIG. 6A. The free end of the composite is then bent up in such a way that it forms an angle of 160° with the plane of the metal plate 17. The free end of the tape is pulled against the stuck end of the tape at a constant rate of 0.1 mm per second in the arrow direction, during which the tensile force in the tape constantly increases until the layer composite tears at point C (FIG. 6B). FIG. 6D shows the change in force, and point A indicates the tear peak of the layer composite. During the remainder of the measurement, the adhesive strength of the cholesteric layer 2 to the support 1 is measured, as shown in FIG. 6C. In the force diagram in FIG. 6D, point B denotes the adhesive strength of the cholesteric layer to the support.

The tensile stresses in the layer composite are recorded using a high-resolution sensor and plotted as peel force in cN using a y-T plotter.

General Methods:

a) Determination of the Interference Homogeneity:

A piece of a coated sample material is cut out and embedded for 12 hours at about 160° C. in a 4-component resin consisting of AGAR 100 (epoxy resin), DDSA (dodecenylsuccinic anhydride), MNA (methylnadic anhydride) and BDMA (benzyldimethylamine). The fixed sample is then clamped in a holder, trimmed and cut with a sectioned thickness of 100 nm using a diamond blade in a commercially available microtome at a cutting speed of 1 mm/s. The sections are collected on distilled water, stretched using chloroform, collected in a slot diaphragm and photographed in a commercially available transmission electron microscope (TEM) using a digital camera at a magnification of 20,000 times. The dark zones of the interference pattern are zones of high electron absorption at points where the electron beam runs in the longitudinal axis of the rod-shaped molecules. The pitch height corresponds to 2.5 times of two consecutive interference patterns.

b) Determination of the Color Shift Stability of the Layered Materials According to the Invention:

A piece of coated sample material, for example consisting of layer support, release layer and the cholesteric layers coated thereon, is treated for 15 minutes in a xylene bath warmed to 80° C. and subsequently dried, which can take, for example, over one hour at approximately 80° C.; the reflection maximum of the sample treated in this way is then determined by known optical methods in comparison to an untreated sample, and the color shift is calculated therefrom. It has been found that the cholesteric layer according to the invention has adequate solvent and heat stability if this color shift measured in this way is at most from about 5 to 10 nm, preferably less than 3 nm. In particular, no visually evident color difference is observed under these conditions in a conventional paint composition containing a cholesteric pigment according to the invention at an application temperature of between 80° C. and 130° C.

Example 1

Production of Cholesteric Single-layer Material Having an Inhomogeneous Interference Line Pattern 100 g of a nematic compound of the formula (H) were stirred with 4.52 g of a chiral compound of the formula (B), 104.5 g of tetrahydrofuran, 5 g of a 1% strength solution of a flow-control agent (BYK 363 from Byk) in tetrahydrofuran and 2 g of the photoinitiator Irgacure 184 (Ciba-Geigy) to give a clear solution.

The mixture was coated onto a PET layer support with a thickness of 14 $\mu$m in a dry thickness of 4.8 $\mu$m using a coating device as described in DE 1973836.9 (knife coater) at a coater excess pressure of 0.2 bar. The residence time in the dry zone heated to 85° C. was 24 seconds, then the coated material was crosslinked by means of UV irradiation at a lamp power of 120 W/cm at a temperature of 60° C. at an exposure time of 120 ms under a nitrogen atmosphere.

On a black background, the layer obtained in this way exhibits a green hue with a strong angle dependence to blue; the color impression is destroyed by cloudiness, i.e. by fogging observed in plan view. A sample of the effect layer obtained in this way was investigated for interference line homogeneity as described above. FIG. 1 shows the corresponding TEM micrograph.

Example 2

Production of Cholesteric Multilayer Material Having an Inhomogeneous Interference Line Pattern The procedure was as in Example 1, but the dry layer thickness was 2.4 $\mu$m. A second layer was applied to this layer in the same thickness and under the same conditions. On investigation of the interference lines, significant disruption was observed at the interface line between the first and second layers (FIG. 2).

The adhesive strength of the $1^{st}$ layer to the support was 0.7 cN, and that of the $2^{nd}$ layer to the $1^{st}$ layer was 2.3 cN.

Example 3

Investigation of a Commercially Available Cholesteric Effect Pigment for Interference Line Homogeneity A commercially available cholesteric effect pigment (LC pigment green; Wacker) was fixed as described above and studied by electron microscopy. A TEM micrograph thereof is shown in FIG. 3. The interference line inhomogeneity (eye formation, inversions) is clearly evident over the entire layer thickness.

Example 4

Production of a Single Cholesteric Layer Having a Homogeneous Interference Line Pattern The procedure was as in Example 2, but the dry layer thickness of the second layer was 0.9 $\mu$m and the crosslinking temperature for both layers was 100° C.

The adhesive strength of the $1^{st}$ layer to the support was >8 cN, and that of the $2^{nd}$ layer to the first was 0.8 cN.

The $2^{nd}$ layer was detached from the $1^{st}$ layer after the layer composite had been scored, fixed as described above and investigated by microscopy. FIG. 4 shows a corresponding TEM micrograph. The cholesteric layer surprisingly exhibits no inhomogeneities in the interference line pattern.

Example 5

Production of a Cholesteric Multilayer Composite Having a Homogeneous Interference Line Pattern The procedure was as in Example 1, but the dry layer thickness was 0.9 $\mu$m and the crosslinking temperature was 100° C. The coating was repeated identically a further 7 times, producing a composite of 8 layers having a total dry thickness of 7.2 $\mu$m on the layer support.

TEM thin sections show completely undisturbed formation of the interference lines over the entire layer composite (FIG. 5). The adhesive strength of the $1^{st}$ layer to the support was greater than 8 cN, and that of all subsequent layers to the next-lowest was less than 1 cN.

Example 6

Preparation of Cholesteric Effect Pigments of High Color Brightness

The layer composite from Example 5 was separated from the support by means of an air knife, leaving the $1^{st}$ layer on the support. The detached flakes were ground to a particle size of 15 $\mu$m. During the grinding operation, the multilayer composite delaminated to give single-layer pigment flakes. These were incorporated into a spray formulation consisting of a melamin-crosslinked cellulose acetobutyrate (CAB) baking finish (pigment concentration 4% by weight; solids content 20% by weight; solvent mixture consisting of butyl acetate, butyl acetate and xylene in the ratio 6:3:3. This mixture was sprayed onto a black metal sheet in a dry thickness of 25 $\mu$m. The sheet exhibited a bright green hue with a strong angle dependence to blue.

In each case a sheet was subsequently treated for 30 minutes at a baking temperature of 80, 130 or 160° C. On subsequent measurement of the 3 samples in a conventional spectrometer, no change in the reflection wavelength ($\lambda_{max}$) was observed.

Example 7

Production of a Broad-band Polarizer

The procedure was analogous to Example 5, but a layer composite having different reflection wavelengths was produced by varying the ratio of nematic to chiral compound in the individual layers.

The following formulations were used:

| Formulation No. | Nematic Comp. [g] | Chiral Comp. [g] |
| --- | --- | --- |
| 0 | 93.0 | 7.0 |
| 1 | 96.5 | 3.5 |
| 2 | 96.25 | 3.75 |
| 3 | 96.0 | 4.0 |
| 4 | 95.75 | 4.25 |
| 5 | 95.5 | 4.5 |
| 6 | 95.25 | 4.75 |

-continued

| Formulation No. | Nematic Comp. [g] | Chiral Comp. [g] |
|---|---|---|
| 7 | 95.0 | 5.0 |
| 8 | 94.5 | 5.5 |
| 9 | 94.0 | 6.0 |

The cholesteric compound and the nematic compound were taken up in 100 g of THF, and 5 g of BYK 361 (1% strength in THF) and 2 g of Irgacure 181 were added.

Firstly, a first layer with formulation No. 0 was applied to the support analogously to Example 5, but in a layer thickness of 1.0 μm. A further 13 layers with the following formulations were then coated successively, each with a layer thickness of 1.3 μm and with a residence time in the dry zone of 9.6 s and a UV irradiation time of 48 ms. The temperatures during drying and curing were selected as in Example 5. The reflection maxima of the individual layers are shown by the following table.

| Layer | Formulation No. | Reflection Maximum (nm) |
|---|---|---|
| PET-support | | |
| 1 | 0 | 352 |
| 2 | 9 | 403 |
| 3 | 8 | 426 |
| 4 | 7 | 464 |
| 5 | 6 | 482 |
| 6 | 5 | 519 |
| 7 | 4 | 546 |
| 8 | 4 | 546 |
| 9 | 3 | 580 |
| 10 | 3 | 580 |
| 11 | 2 | 624 |
| 12 | 2 | 624 |
| 13 | 2 | 624 |
| 14 | 1 | 669 |

The adhesive strength of the $1^{st}$ layer to the support was greater than 8 cN, that of the $2^{nd}$ layer to the $1^{st}$ layer was 0.7 cN, and the adhesive strengths of layers 3 to 14 to the next-lowest layer was in each case about 1.75 cN.

On separation of the layer composite by means of an air knife, the composite separates between the first and second layers, enabling layers 2 to 14 to be separated as a unit. The detached layer composite exhibited a surface with a metallic appearance; on transmission measurement in a conventional spectrometer, an even reflection of 40% over a wavelength range of from 400 to is 700 nm was measured. The composite was suitable for use as a highly transparent broadband polarizer with right-handed rotation.

TEM thin layer micrographs show a homogeneous course of the interference line pattern for all 14 layers.

Example 8

Production of Cholesteric Layers of High Solvent Resistance and Different Interference Line Homogeneity a) 100 g of a nematic compound of the formula (H) were stirred with 3.25 g of a chiral compound of the formula (B), 103.25 g of tetrahydrofuran, 5 g of a 1% solution of BYK 361 in tetrahydrofuran and 2 g of Irgacure 184 to give a clear solution. This mixture was coated onto a PET layer support with a thickness of 14 μm in a dry layer thickness of 2.5 μm by means of a knife coater at a coating excess pressure of 0.2 bar. The residence time in the dry zone following the coating device was 24 s at 100° C. The coating rate was 10 m/min. The crosslinking was carried out at 100° C. using a UV lamp with a power of 120 W/cm under a nitrogen atmosphere.

On a black background, the layer obtained in this way gave a deep-red bright impression with a strong angle dependence to black when observed at an inclined angle.

b) The procedure was as in section a), but the temperature during the drying was 60° C.

c) The procedure was as in section a), but the drying temperature was 25° C.

The properties with respect to interference line homogeneity and solvent resistance are shown in the following table:

| Example | Layer thickness [μm] | Drying temperature [° C.] | Interference line homogeneity | Solvent stability[1] |
|---|---|---|---|---|
| 8a | 2.5 | 100 | very homogeneous | $\Delta \lambda_{max} = 0$ |
| 8b | 2.5 | 60 | homogeneous, slight vertical offset in places | $\Delta \lambda_{max} = 0$ |
| 8c | 2.5 | 25 | strong disturbances | $\Delta \lambda_{max} = 0$ |

[1]Change in the reflection maximum after xylene treatment (15 min/80° C.)

What is claimed is:

1. A cholesteric layered material comprising at least one three-dimensionally crosslinked, aligned cholesteric layer, wherein the crosslinked cholesteric layer(s) has (have) a homogeneous interference line pattern substantially over the entire layer thickness, and wherein the interference line pattern exhibits no line inversion and/or no eye formation.

2. The cholesteric layered material as claimed in claim 1, wherein the interference lines of the interference line pattern extend substantially parallel to the layer surface, and each cholesteric layer has a substantially smooth surface.

3. A cholesteric layered material as claimed in claim 1, wherein the cholesteric layer comprises cholesteric mixtures selected from the group consisting of a) at least one cholesteric, polymerizable monomer;
b) at least one achiral, nematic, polymerizable monomer and a chiral compound;
c) at least one cholesteric, crosslinkable polymer;
d) a cholesteric polymer in a polymerizable diluent; and
e) at least one cholesteric polymer whose cholesteric phase can be frozen by rapid cooling to below the glass transition temperature.

4. The cholesteric layered material as claimed in claim 1, wherein the cholesteric layer has a mean dry layer thickness of less than about 5 μm.

5. The cholesteric layered material as claimed in claim 1, wherein the cholesteric layer has a mean dry layer thickness of at least one pitch height.

6. The cholesteric layered material as claimed in claim 1, which comprises a plurality of cholesteric layers of identical or different thickness and identical or different chemical composition, each of which has a homogeneous interference line pattern substantially over the entire layer thickness.

7. The cholesteric layered material as claimed in claim 1, wherein the cholesteric layer(s) exhibit(s) no visually evident color shift on a temperature change and/or exposure to diluents.

8. The cholesteric layered material as claimed in claim 7, wherein the reflection maximum of the cholesteric layer(s) after treatment in xylene at 80° C. for 15 minutes and subsequent drying exhibits (exhibit) no visually evident color shift.

9. An optical filter comprising a layer of material as claimed in claim 1, optionally applied to a support film.

10. A process for the production of a cholesteric layered material as claimed in claim 1, which comprises:
 a) casting a cholesteric coating composition comprising at least one crosslinkable substance onto a support to form a first cholesteric layer, and aligning said first cholesteric layer, wherein the support is substantially chemically inert to the first cholesteric layer applied;
 b) drying and crosslinking of the first cholesteric layer, wherein the conditions are selected in such a way that the resultant cholesteric layer has a homogeneous interference line pattern substantially over the entire layer thickness; and
 c) removing the cholesteric layered material from the support after one or more further aligned cholesteric layers have optionally been applied to the first cholesteric layer obtained in accordance with step b.

11. A process as claimed in claim 10, wherein a support is employed which does not adversely affect the alignment of the cholesteric layer cast thereon during drying and curing.

12. The process as claimed in claim 10, wherein the support has an adhesion of less than about 1 cN to the dried and crosslinked first cholesteric layer cast thereon.

13. The process as claimed in claim 10, wherein the support is plastic, metal, glass or ceramic.

14. The process as claimed in claim 13, wherein the plastic support comprises a release layer of crosslinked, preferably aligned, cholesteric material onto which the first cholesteric layer is cast.

15. The process as claimed in claim 14, wherein the adhesion between plastic support and release layer is at least about twice the adhesion between release layer and first cholesteric layer.

16. The process as claimed in claim 10, wherein the coating compositions for the cholesteric layer(s) have a viscosity in the range from about 1 to 50 mPas, and the application rate is in the range from about 1 to 800 m/min.

17. The process as claimed in claim 10, wherein the crosslinking of the cholesteric layer(s) and of an optional cholesteric release layer present is carried out by electron beams or UV radiation with simultaneous warming of the layer(s) to be cured, wherein the emitter power is from about 50 to 200 watts/cm at an irradiation duration of from about 2 to 5000 msec.

18. The process as claimed in claim 17, wherein the layer temperature during the radiation curing is at least about 60° C., in particular at least about 80° C., preferably at least about 90° C.

19. The process as claimed in claim 10, wherein a further support film is applied to the cholesteric layer applied last, and the one or more cholesteric layers are removed from the support as a composite.

20. The process as claimed in claim 10, wherein one or more cholesteric layers are removed from the support by blasting with compressed air, a water jet or steam and ground to give pigments.

21. A process as claimed in claim 10, wherein the crosslinking of the cholesteric layer(s) and of an optional cholesteric release layer present is carried out by electron beams or UV radiation with simultaneous warming of the layer to be cured, wherein the emitter power is from about 100 to 140 watts/cm at an irradiation duration of from about 30 to 200 msec.

22. A process as claimed in claim 10, wherein the cholesteric layer comprise cholesteric mixtures selected from the group consisting of
 a) at least one cholesteric, polymerizable monomer;
 b) at least one achiral, nematic, polymerizable monomer and a chiral compound;
 c) at least one cholesteric, crosslinkable polymer;
 d) a cholesteric polymer in a polymerizable diluent; and
 e) at least one cholesteric polymer whose cholesteric phase can be frozen by rapid cooling to below the glass transition temperature.

23. A cholesteric layered material as claimed in claim 1, wherein the cholesteric layer has a mean dry layer thickness of less than or equal to about 1 $\mu$m.

24. A polarizer comprising a layered material as claimed in claim 1, optionally applied to a support film.

25. A broad-band polarizer comprising a layered material as claimed in claim 1 comprising a number of from 3 to 20 cholesteric layers with reflection maxima matched to one another, wherein the polarizer has a total thickness (without support film) in the range from about 2 to 50 $\mu$m.

26. A cholesteric layered material as claimed in claim 1, wherein the cholesteric layer has a mean dry layer thickness of less than about 2 $\mu$m.

27. The cholesteric pigment comprising at least one crosslinked, aligned cholesteric layer having a mean particle size in the range from 5 to 50 $\mu$m and a thickness of from 0.2 to 5 $\mu$m, wherein the cholesteric layer(s) has (have) the properties of claim 1.

28. The composition comprising at least one cholesteric pigment as claimed in claim 27.

29. A coating or paint on a utility article or a motor vehicle comprising the composition as claimed in claim 28.

30. A motor vehicle, motor vehicle accessory, computer, leisure component, sport component, toy, optical component, cosmetic, textile, leather, jewelry, gift article, writing implement, spectacle frame, construction component, domestic component, print product, paint, coating or anti-counterfeit article comprising the pigment as claimed in claim 27.

* * * * *